US009108261B1

(12) United States Patent
Patrick

(10) Patent No.: US 9,108,261 B1
(45) Date of Patent: Aug. 18, 2015

(54) LED LIGHTING HEAT SINK AND HOUSING CONSTRUCTION MADE BY OVEN BRAZING TECHNIQUE

(75) Inventor: Ellis W. Patrick, Sharpsburg, GA (US)

(73) Assignee: Cooper Technologies Company, Houston, TX (US)

(*) Notice: Subject to any disclaimer, the term of this patent is extended or adjusted under 35 U.S.C. 154(b) by 152 days.

(21) Appl. No.: 13/559,184

(22) Filed: Jul. 26, 2012

Related U.S. Application Data

(60) Provisional application No. 61/512,193, filed on Jul. 27, 2011, provisional application No. 61/579,260, filed on Dec. 22, 2011.

(51) Int. Cl.
*B23K 31/00* (2006.01)
*B23K 1/00* (2006.01)

(52) U.S. Cl.
CPC ........... *B23K 1/0008* (2013.01); *B23K 2201/00* (2013.01)

(58) Field of Classification Search
USPC ........ 228/245, 246, 262.5–262.51; 29/DIG. 4
See application file for complete search history.

(56) References Cited

U.S. PATENT DOCUMENTS

| | | | | |
|---|---|---|---|---|
| 2,602,413 | A * | 7/1952 | Miller | 428/654 |
| 4,052,607 | A * | 10/1977 | Larson | 362/18 |
| 5,971,258 | A * | 10/1999 | Eichhorn et al. | 228/262.51 |
| 6,612,600 | B2 * | 9/2003 | Devitt et al. | 280/288.3 |
| 7,396,146 | B2 | 7/2008 | Wang | |
| 7,959,332 | B2 | 6/2011 | Tickner et al. | |
| 2009/0073688 | A1 * | 3/2009 | Patrick | 362/232 |
| 2010/0182782 | A1 * | 7/2010 | Ladewig | 362/235 |
| 2010/0208460 | A1 * | 8/2010 | Ladewig et al. | 362/235 |

FOREIGN PATENT DOCUMENTS

JP          61165268 A  *  7/1986

* cited by examiner

*Primary Examiner* — Devang R Patel
(74) *Attorney, Agent, or Firm* — King & Spalding LLP

(57) ABSTRACT

A method of assembling a light fixture includes positioning a first and a second portion of a light fixture adjacent one another. The method includes applying a brazing material between these portions and fastening the portions together with a coupling device, wherein one or more gaps are formed therebetween the portions. The method includes pre-heating the portions and the brazing material to a first temperature and placing them into a molten salt bath, wherein the brazing material flows into the gaps. The method includes cooling the fastened portions to form a metallurgical bond therebetween. The fixture includes a base, a manifold chamber, and a plurality of structures extending from a second surface of the base to the chamber, which defines a manifold therein. The base includes one or more openings extending therethrough. Each structure defines a wire way that is in communication with the chamber and one or more openings.

17 Claims, 30 Drawing Sheets

LED LIGHTING HEAT SINK AND HOUSING CONSTRUCTION MADE BY OVEN BRAZING TECHNIQUE

RELATED APPLICATIONS

This patent application claims priority under 35 U.S.C. §119 to U.S. Provisional Patent Application No. 61/512,193, titled "LED Lighting Heat Sink And Housing Construction Made By Oven Brazing Technique," filed Jul. 27, 2011, and to U.S. Provisional Patent Application No. 61/579,260, titled "LED Lighting Heat Sink And Housing Construction Made By Oven Brazing Technique," filed Dec. 22, 2011. The complete disclosure of each of the foregoing priority and related applications is hereby fully incorporated herein by reference.

TECHNICAL FIELD

The present disclosure relates generally to light fixtures, and more particularly to heat sinks and housing constructions of light emitting diode ("LED") lighting fixtures and methods for making these heat sinks and housing constructions.

BACKGROUND

The use of LEDs in lighting fixtures in place of conventional incandescent, fluorescent, and neon lamps has a number of advantages. LEDs tend to be less expensive and longer lasting than conventional incandescent, fluorescent, and neon lamps. In addition, LEDs generally output more light per watt of electricity than incandescent, fluorescent, and neon lamps. Although some advantages for LEDs have been mentioned, there are several additional advantages that LEDs provide.

However, the operability, life span, and/or other characteristics of the LEDs may be compromised if the heat generated by the LEDs is not properly removed from the lighting fixture. The heat generated from the LEDs is generally removed from the lighting fixture using heat removal devices, which are either active heat removal devices, such as fans, and/or passive heat removal devices, such as heat sinks. These passive heat sinks are typically constructed using conventional extrusion methods or conventional die casting methods, which both possess certain limitations.

Although there are numerous limitations with respect to forming heat sinks using the conventional extrusion methods, some limitations include restricting the heat sink size based on a certain diameter of the (typically circular) block of material to be extruded restricting the heat sink to be formed linearly, having a tongue depth to fin spacing ratio, bonding of only similar type materials, having the height, shape and thickness of the fins be limited, transitioning issues between thick and thin materials, and requiring fillets during formation. Also, there are numerous limitations with respect to forming heat sinks using the conventional die cast methods. Some limitations include requiring a draft and therefore heavier resulting components, bonding of only similar type materials, and having minimum material thickness requirements.

Further, conventional LED lighting fixtures typically have one or more LED modules that are supplied power for illuminating a desired area. When more than one LED module is supplied power, there have generally been issues with respect to routing the wires and/or concealing the wires that extend from a driver to the LED modules. These electrical wires are typically exposed in certain areas and are unappealing to an observer.

SUMMARY

One exemplary embodiment of the invention includes a method of assembling a light fixture. The method can include positioning a first portion of a light fixture housing adjacent a second portion of the light fixture housing. The method also can include applying a brazing material between the first and second portions of the light fixture housing. The method further can include fastening the first portion of the light fixture to the second portion of the light fixture with at least one coupling device. One or more gaps can be formed between the first portion of the light fixture housing and the second portion of the light fixture housing. The method also can include pre-heating the fastened first and second portions of the light fixture housing and the brazing material to a first temperature. The method also can include placing the fastened first and second portions of the light fixture housing and the brazing material into a molten salt bath. The brazing material can flow into the gaps between the first and second portions of the light fixture housing. The method also can include cooling the fastened first and second portions of the light fixture housing to form a metallurgical bond therebetween.

Another exemplary embodiment of the invention includes a light fixture. The light fixture can include a base, a manifold chamber, and a plurality of structures. The base can include a first surface, a second surface facing a direction substantially opposite the first surface, and one or more openings extending from the first surface to the second surface. The manifold chamber can define a manifold therein. The plurality of structures can extend outwardly away from the second surface to the manifold chamber. Each structure can define a wire way therein. Each wire way can be in communication with the manifold at one end and with one or more openings at an opposing end.

Another exemplary embodiment of the invention includes a method for fabricating a light fixture. The method can include obtaining a base. The base can include a platform, one or more fins, and a manifold chamber. The platform can include a first surface, a second surface facing a direction substantially opposite the first surface, and one or more openings extending from the first surface to the second surface. One or more fins can be extending outwardly from the second surface. The manifold chamber can define a manifold therein and can be coupled to at least a first fin and a second fin. A portion of the manifold chamber, the first fin, and the second fin can form a wire way therein. The wire way can extend to one or more openings arranged in a first array. The method also can include coupling a front panel to at least the edges of the manifold chamber, the first fin, and the second fin. The method also can include coupling a rear panel to at least the opposing edges of the manifold chamber, the first fin, and the second fin. The coupling of the front panel and the rear panel can form a water-tight seal with at least the edges of the manifold chamber, the first fin, and the second fin.

BRIEF DESCRIPTION OF THE DRAWINGS

The foregoing and other features and aspects of the invention are best understood with reference to the following description of certain exemplary embodiments, when read in conjunction with the accompanying drawings, wherein.

Figure 1:
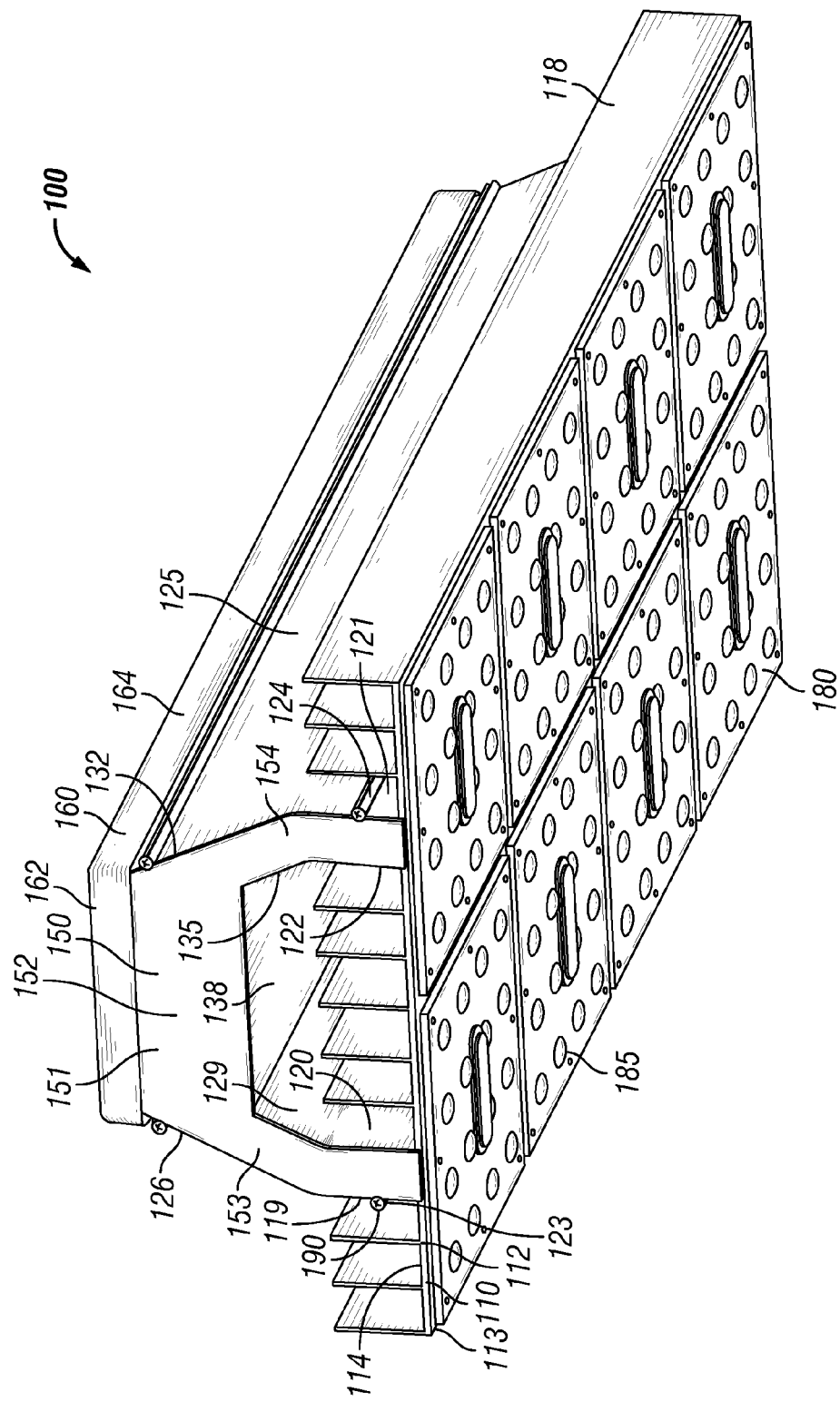
FIG. 1 shows a perspective view of an LED lighting fixture in accordance with an exemplary embodiment of the present invention.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles.

DETAILED DESCRIPTION OF THE EXEMPLARY EMBODIMENTS

Embodiments of the invention are directed to heat sinks and housing constructions of light emitting diode ("LED") lighting fixtures and methods for making these heat sinks and housing constructions. Embodiments of the invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. The disclosure is better understood by reading the following description of non-limiting, exemplary embodiments with reference to the attached drawings, wherein like, but not necessarily the same or identical, parts of each of the figures are identified by like reference characters, and which are briefly described as follows.

Figure 2:
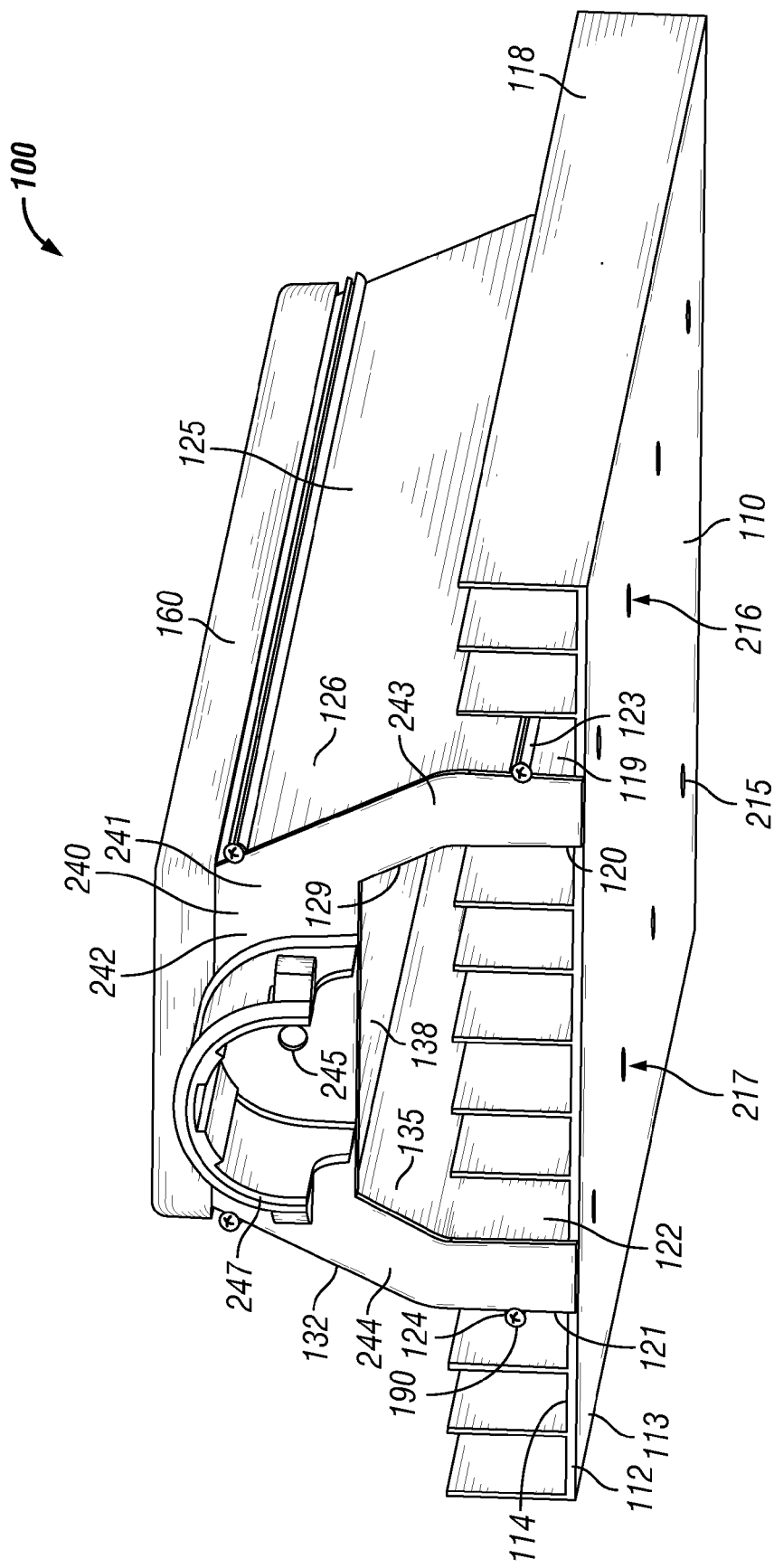
FIG. 2 shows another perspective view of the LED lighting fixture of FIG. 1 without the LED modules coupled thereto in accordance with an exemplary embodiment of the present invention.
Figure 3:
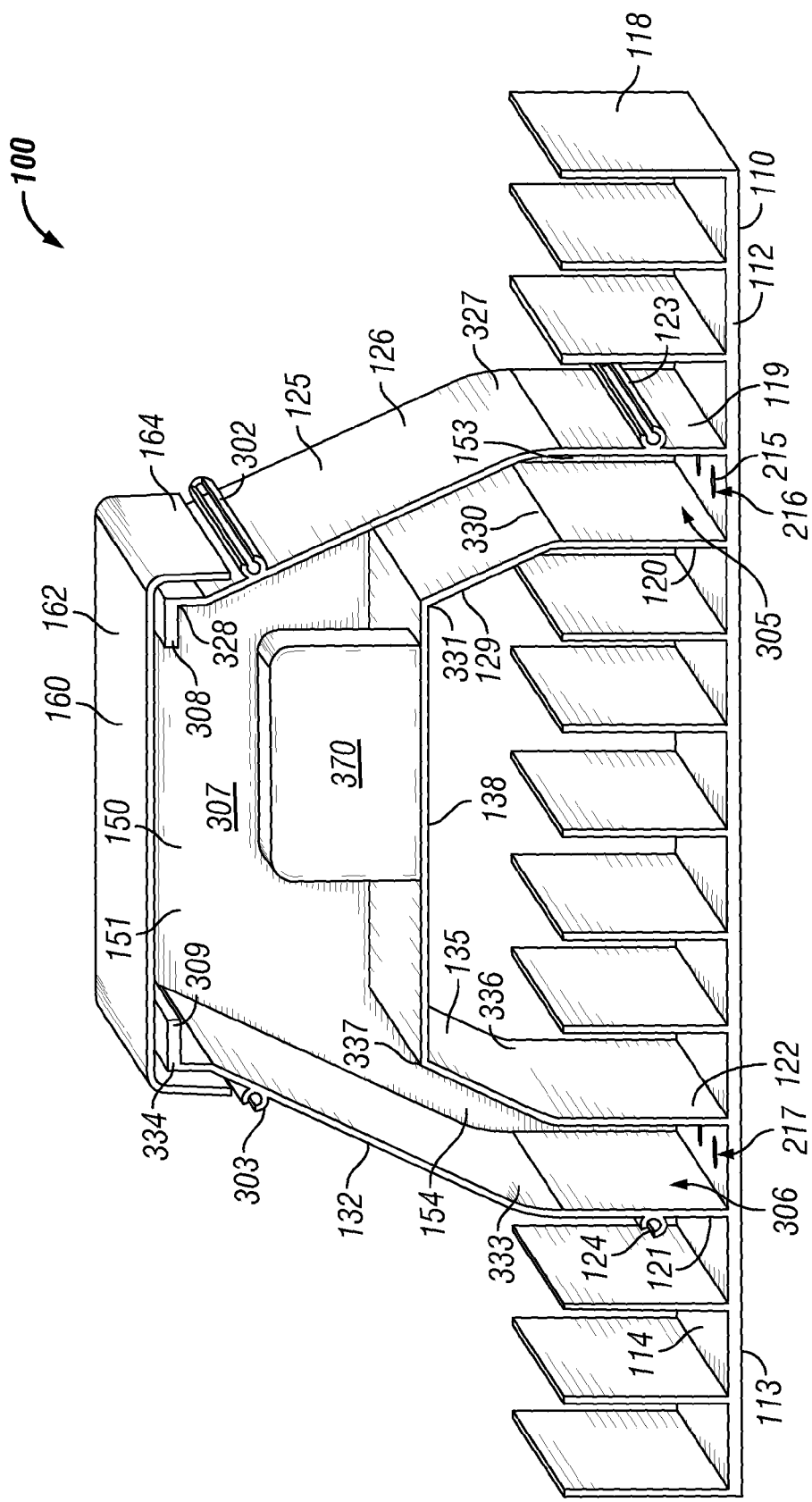
FIG. 3 shows a cross-sectional perspective view of the LED lighting fixture of FIG. 2 in accordance with an exemplary embodiment of the present invention.
Figure 4:
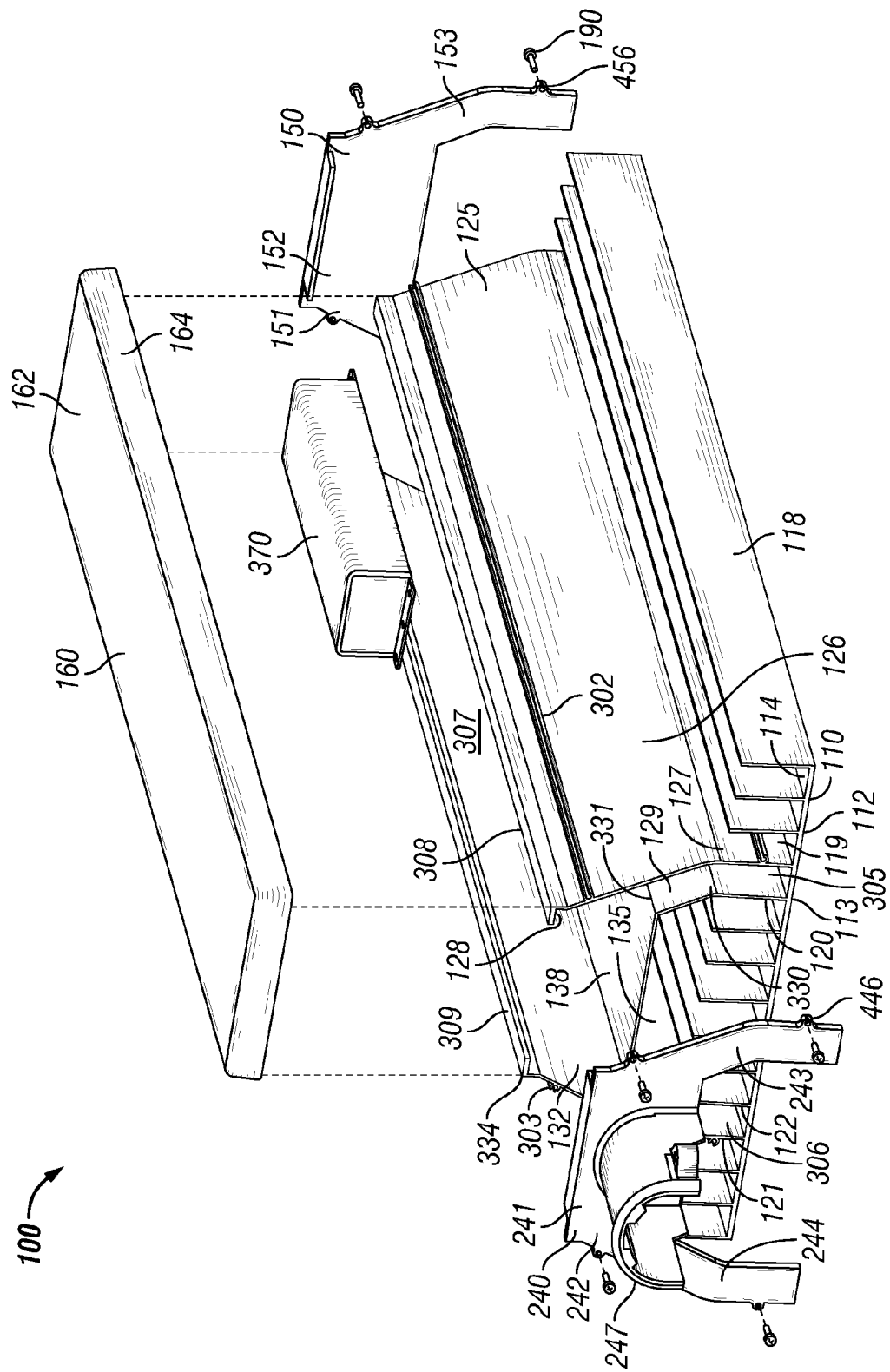
FIG. 4 shows an exploded view of the LED lighting fixture of FIG. 2 in accordance with an exemplary embodiment of the present invention.

FIGS. 1-4 show various views of an LED lighting fixture 100 in accordance with an exemplary embodiment of the present invention. Specifically, FIG. 1 shows a perspective view of an LED lighting fixture 100 in accordance with an exemplary embodiment of the present invention. FIG. 2 shows another perspective view of the LED lighting fixture 100 without the LED modules 180 coupled thereto in accordance with an exemplary embodiment of the present invention. FIG. 3 shows a cross-sectional perspective view of the LED lighting fixture 100 without the LED modules 180 coupled thereto in accordance with an exemplary embodiment of the present invention. FIG. 4 shows an exploded view of the LED lighting fixture 100 without the LED modules 180 coupled thereto in accordance with an exemplary embodiment of the present invention. Referring to FIGS. 1-4, the LED lighting fixture 100 includes a base 110, a front panel 240, a rear panel 150, a cover 160, one or more drivers 370, and one or more LED modules 180. Optionally, the LED lighting fixture 100 includes one or more mounting hardwares 190, such as screws, for permanently and/or temporarily coupling one or more of the previously mentioned components to at least one other previously mentioned component. Additionally, although not shown, the LED lighting fixture 100 also includes one or more electrical wires (not shown) electrically coupling each driver 370 to one or more LED modules 180.

The base 110 includes a platform 112, one or more fins 118, and a manifold chamber 125. The platform 112 is substantially planar and includes a first surface 113 facing one direction and a second surface 114 facing an opposite direction. The platform 112 also includes one or more openings 215 extending from the first surface 113 to the second surface 114. These openings 215 provide a pathway for the electrical wires to electrically couple the driver 370 to the one or more LED modules 180, which is discussed in further detail below. According to some exemplary embodiments, several openings 215 are formed along the length of the platform 112 in substantially a first linear orientation 216 and substantially a second linear orientation 217. In some exemplary embodiments, the second linear orientation 217 is substantially parallel to the first linear orientation 216. The platform 112 is substantially rectangularly shaped, but is shaped differently, such as being circularly shaped, in other exemplary embodiments. In certain exemplary embodiments, the openings 215 are oriented in one or more circular patterns or some other orientation. The platform 112 is fabricated from aluminum and is extruded in certain exemplary embodiments; however, the platform 112 is fabricated using other suitable materials and/or using other suitable manufacturing processes that are known to persons having ordinary skill in the art and having the benefit of the present disclosure.

The base 110 includes one or more fins 118 extending substantially perpendicularly away from the second surface 114. According to certain exemplary embodiments, each fin 118 extends substantially parallel to one another and substantially linear along the length of the platform 112. The fins 118 also are substantially equidistantly spaced apart in some exemplary embodiments, while in others, the fins 118 are spaced apart one or more different distances. In other exemplary embodiments, the fins 118 are not linear along the length of the platform 112. In some exemplary embodiments, the fins 118 include a first fin 119, a second fin 120, a third fin 121, and a fourth fin 122. In certain exemplary embodiments, the first fin 119 and the second fin 120 are adjacently positioned to one another and are positioned so that the first linear orientation 216 is disposed between the first fin 119 and the second fin 120. Similarly, in certain exemplary embodiments, the third fin 121 and the fourth fin 122 are adjacently positioned to one another and are positioned so that the second linear orientation 217 is disposed between the third fin 121 and the fourth fin 122. The second fin 120 and the fourth fin 122 are each positioned closer to the middle of the platform 112 than the first fin 119 and the third fin 121. According to some exemplary embodiments, each of the first fin 119 and the third fin 121 include a screw track 123, 124, respectively, that extends along the length of each of the first fin 119 and the third fin 121 and is disposed a desired distance away from the second surface 114. However, the screw tracks 123, 124 extend non-continuously and/or at different elevations along the length of the first fin 119 and/or the third fin 121 in certain exemplary embodiments. These screw tracks 123, 124 are capable of receiving a respective mounting hardware 190, which is discussed in further detail below. In some instances where the platform 112 is circularly shaped, the fins 118 also are circularly shaped, in some exemplary embodiments, and aligned concentrically to one another. The fins 118 are fabricated from aluminum and are extruded in certain exemplary embodiments; however, the fins 118 are fabricated using other suitable materials and/or using other suitable manufacturing processes that are known to persons having ordinary skill in the art and having the benefit of the present disclosure. The fins 118 are fabricated with the platform 112 as a single component, but are fabricated separately in other exemplary embodiments. Also, each of the screw tracks 123, 124 is also formed using an extrusion process according to certain exemplary embodiments.

The manifold chamber 125 includes a first outer arm 126, a first inner arm 129, a second outer arm 132, a second inner arm 135, and a manifold base 138. The first outer arm 126 includes a first outer arm adjacent end 327 and a first outer arm distal end 328 and extends outwardly from an end of the first fin 119 along its length in a direction that is further away from the second surface 114. The first outer arm 126 extends at an angle from the first fin 119 in a direction that is inwardly towards the middle area of the base 110. However, in other exemplary embodiments, the first outer arm 126 extends from the end of the first fin 119 in a linear direction that is further away from the second surface 114 such that the first fin 119 and the first outer arm 126 form a 180 degree angle or extend from the end of the first fin 119 in a direction that is further away from the second surface 114 and outwardly away from the middle area of the base 110. According to some exemplary embodiments, the first outer arm 126 also includes a first outer arm flange 308 that extends inwardly towards the middle area of the base 110 from the length of the first outer arm distal end 328. According to some exemplary embodiments, the first outer arm 126 includes a screw track 302 that extends along its length and is disposed a desired distance away from the first fin 119. However, the screw track 302 extends non-continuously and/or at different elevations along the length of the first outer arm 126 in certain exemplary embodiments. Screw track 302 is capable of receiving a respective mounting hardware 190, which is discussed in further detail below. This screw track 302 is formed using an extrusion process according to certain exemplary embodiments, but can be formed using other known methods.

The first inner arm 129 includes a first inner arm adjacent end 330 and a first inner arm distal end 331 and extends outwardly from an end of the second fin 120 along its length in a direction that is further away from the second surface 114. The first inner arm 129 extends at an angle from the second fin 120 in a direction that is inwardly towards the middle area of the base 110. In certain exemplary embodiments, the first inner arm 129 is substantially parallel to at least a portion of the first outer arm 126. The first inner arm 129 extends a distance away from the second fin 120 which is less than the distance that the first outer arm 126 extends away from the first fin 119. However, in other exemplary embodiments, the first inner arm 129 extends from the end of the second fin 120 in a linear direction that is further away from the second surface 114 such that the second fin 120 and the first inner arm 129 form a 180 degree angle or extend from the end of the second fin 120 in a direction that is further away from the second surface 114 and outwardly away from the middle area of the base 110.

The second outer arm 132 includes a second outer arm adjacent end 333 and a second outer arm distal end 334 and extends outwardly from an end of the third fin 121 along its length in a direction that is further away from the second surface 114. The second outer arm 132 extends at an angle from the third fin 121 in a direction that is inwardly towards the middle area of the base 110. However, in other exemplary embodiments, the second outer arm 132 extends from the end of the third fin 121 in a linear direction that is further away from the second surface 114 such that the third fin 121 and the second outer arm 132 form a 180 degree angle or extend from the end of the third fin 121 in a direction that is further away from the second surface 114 and outwardly away from the middle area of the base 110. The second outer arm distal end 334 lies in a substantially horizontal plane that includes the first outer arm distal end 328 according to certain exemplary embodiments. According to some exemplary embodiments, the second outer arm 132 also includes a second outer arm flange 309 that extends inwardly towards the middle area of the base 110 from the length of the second outer arm distal end 334. According to some exemplary embodiments, the second outer arm 132 includes a screw track 303 that extends along its length and is disposed a desired distance away from the third fin 121. However, the screw track 303 extends non-continuously and/or at different elevations along the length of the second outer arm 132 in certain exemplary embodiments. Screw track 303 is capable of receiving a respective mounting hardware 190, which is discussed in further detail below. This screw track 303 is formed using an extrusion process according to certain exemplary embodiments, but can be formed using other known methods. Although four screw tracks 123, 124, 302, 303 are shown, greater or fewer screw tracks are used in other exemplary embodiments.

The second inner arm 135 includes a second inner arm adjacent end 336 and a second inner arm distal end 337 and extends outwardly from an end of the fourth fin 122 along its length in a direction that is further away from the second surface 114. The second inner arm 135 extends at an angle from the fourth fin 122 in a direction that is inwardly towards the middle area of the base 110. In certain exemplary embodiments, the second inner arm 135 is substantially parallel to at least a portion of the second outer arm 132. The second inner arm 135 extends a distance away from the fourth fin 122 which is less than the distance that the second outer arm 132 extends away from the third fin 121. However, in other exemplary embodiments, the second inner arm 135 extends from the end of the fourth fin 122 in a linear direction that is further away from the second surface 114 such that the fourth fin 122 and the second inner arm 135 form a 180 degree angle or extend from the end of the fourth fin 122 in a direction that is further away from the second surface 114 and outwardly away from the middle area of the base 110. The second inner arm distal end 337 lies in a substantially horizontal plane that includes the first inner arm distal end 331 according to certain exemplary embodiments.

The manifold base 138 is substantially planar according to certain exemplary embodiments and extends from the length of the first inner arm distal end 331 to the length of the second inner arm distal end 337. The manifold base 138 provides a support for the drivers 370 to lie upon according to certain exemplary embodiments. The manifold chamber 125 is fabricated from aluminum and is extruded in certain exemplary embodiments; however, the manifold chamber 125 is fabricated using other suitable materials and/or using other suitable manufacturing processes that are known to persons having ordinary skill in the art and having the benefit of the present disclosure. According to certain exemplary embodiments, the manifold chamber 125, the fins 118, and the platform 112 are fabricated as a single component, but are fabricated separately or each being fabricated in multiple components according to other exemplary embodiments.

A first wire way 305 is formed between the first fin 119 and the second fin 120 and between a portion of the first outer arm 126 and the first inner arm 129. The first wire way 305 provides a pathway for electrical wires to proceed from the drivers 370, through the openings 215 of the first linear orientation 216, and to the one or more LED modules 180. Similarly, a second wire way 306 is formed between the third fin 121 and the fourth fin 122 and between a portion of the second outer arm 132 and the second inner arm 135. The second wire way 306 also provides a pathway for electrical wires to proceed from the drivers 370, through the openings 215 of the second linear orientation 217, and to the one or more LED modules 180. A manifold 307 is formed between the manifold base 138, a remaining portion of the first outer arm 126, and a remaining portion of the second outer arm 132. The manifold 307 is communicably coupled to each of the first wire way 305 and the second wire way 306.

The front panel 240 includes a base portion 241 and a fitter 247 extending outwardly from the base portion 241. The base portion 241 is substantially planar according to certain exemplary embodiments and includes a body 242, a first leg 243 extending downward from one side of the body 242, and a second leg 244 extending downward from an opposing side of the body 242. The base portion 241 is shaped substantially according to the shape defined by the side edges of the first fin 119, the second fin 120, the first outer arm 126, the first inner arm 129, the manifold base 138, the second outer arm 132, the second inner arm 135, the third fin 121, the fourth fin 122, and a portion of the platform 112. Specifically, the first leg 243 is shaped substantially according to the shape defined by the side edges of the first fin 119, the second fin 120, a portion of the first outer arm 126, the first inner arm 129, and a portion of the platform 112. Similarly, the second leg 244 is shaped substantially according to the shape defined by the side edges of the third fin 121, the fourth fin 122, a portion of the second outer arm 132, the second inner arm 135, and a portion of the platform 112. Additionally, the body 242 is shaped substantially according to the shape defined by the side edges of the remaining portion of the first outer arm 126, the remaining portion of the second outer arm 132, and the manifold base 138. The base portion 241 also includes an aperture 245 that extends through the base portion 241 and allows for electrical wires to pass through from an exterior power source (not shown) to the drivers 370 positioned within the manifold chamber 125. The base portion 241 also includes one or more openings 446 formed therethrough which each align with a respective screw track 123, 124, 302, 303. These openings 446 are configured to receive mounting hardwares 190 that facilitate permanently coupling and/or temporarily holding the front panel 240 adjacent to the base 110.

The fitter 247 extends orthogonally away from the base portion 241 and couples to a mounting structure (not shown), such as a pole. The fitter 247 is semi-circular in shape and is positioned partially surrounding the aperture 245, but is shaped differently in other exemplary embodiments. According to certain exemplary embodiments, the front panel 240 is fabricated from aluminum and is extruded as a single component. However, in other exemplary embodiments, the front panel 240 is fabricated using other suitable materials and/or is formed using other processes known to persons having ordinary skill in the art and having the benefit of the present disclosure. Additionally, in other exemplary embodiments, the front panel 240 is formed from multiple components that are assembled together thereafter.

The rear panel 150 includes a base portion 151 similar to base portion 241. The base portion 151 is substantially planar according to certain exemplary embodiments and includes a body 152, a first leg 153 extending downward from one side of the body 152, and a second leg 154 extending downward from an opposing side of the body 152. The base portion 151 is shaped substantially according to the shape defined by the side edges of the first fin 119, the second fin 120, the first outer arm 126, the first inner arm 129, the manifold base 138, the second outer arm 132, the second inner arm 135, the third fin 121, the fourth fin 122, and a portion of the platform 112.

Specifically, the first leg 153 is shaped substantially according to the shape defined by the side edges of the first fin 119, the second fin 120, a portion of the first outer arm 126, the first inner arm 129, and a portion of the platform 112. Similarly, the second leg 154 is shaped substantially according to the shape defined by the side edges of the third fin 121, the fourth fin 122, a portion of the second outer arm 132, the second inner arm 135, and a portion of the platform 112. Additionally, the body 152 is shaped substantially according to the shape defined by the side edges of the remaining portion of the first outer arm 126, the remaining portion of the second outer arm 132, and the manifold base 138. The base portion 241 also includes one or more openings 456 formed therethrough, which each align with a respective screw track 123, 124, 302, 303. These openings 456 are configured to receive mounting hardwares 190 that facilitate permanently coupling and/or temporarily holding the rear panel 150 adjacent to the base 110. According to certain exemplary embodiments, the rear panel 150 is fabricated from aluminum and is extruded as a single component. However, in other exemplary embodiments, the rear panel 150 is fabricated using other suitable materials and/or is formed using other processes known to persons having ordinary skill in the art and having the benefit of the present disclosure. Additionally, in other exemplary embodiments, the rear panel 150 is formed from multiple components that are assembled together thereafter.

The cover 160 includes a base 162 and a surrounding wall 164 extending substantially perpendicularly from the perimeter of the base 162. The base 162 is dimensioned to be slightly longer than the length of the first outer arm 126 and the second outer arm 132 and slightly wider than the distance between the upper portion of the first outer arm 126 and the upper portion of the second outer arm 132, thereby covering the manifold chamber 125 once placed atop both the upper portions of the first outer arm 126 and the second outer arm 132. According to certain exemplary embodiments, the cover 160 is fabricated from aluminum and is extruded as a single component. However, in other exemplary embodiments, the cover 160 is fabricated using other suitable materials and/or is formed using other processes known to persons having ordinary skill in the art and having the benefit of the present disclosure. Additionally, in other exemplary embodiments, the cover 160 is formed from multiple components that are assembled together thereafter.

The driver 370 is electrically communicable with the one or more LED modules 180 using one or more electrical wires that pass through the one or more wire ways 305, 306 and is also electrically coupled to the electrical wires routed into the manifold chamber 125 from the aperture 245. The driver 370 provides power to the one or more LED modules 180 and also controls the intensity and/or color of one or more LEDs 185 within the LED modules 180. For example, the driver 370 is capable of dimming the LEDs 185 if desired. The driver 370 produces heat which is removed from within the manifold chamber 125 to an external area outside of the LED light fixture 100 via the fins 118. As previously mentioned, the driver 370 is in contact with the manifold base 138, which is in contact with one or more fins 118. However, in other exemplary embodiments, the driver 370 is coupled within the manifold chamber 125 and is in thermal communication with one or more fins 118 without departing from the scope and spirit of the exemplary embodiment. According to some exemplary embodiments, a plurality of drivers 370 are positioned within the manifold chamber 125 and each are electrically communicable with the one or more LED modules 180 using one or more electrical wires that pass through the one or more wire ways 305, 306.

According to this exemplary embodiment, the LED modules 180 include one or more LED die packages 185, or LEDs, coupled to a substrate (not shown). According to some exemplary embodiments the LED die packages 185, or LEDs, are aligned in a four by four array; however, the LED die packages 185, or LEDs, are aligned in a different array in other exemplary embodiments. The substrate is mounted to the first surface 113 over one of the openings 215 and is oriented so that the LED die packages 185, or LEDs, are emitting light towards a desired illumination area according to certain exemplary embodiments. The substrate includes one or more sheets of ceramic, metal, laminate, circuit board, Mylar®, or another material. Each LED die package 185, or LED, includes a chip of semi-conductive material that is treated to create a positive-negative ("p-n") junction. When the LED die packages 185, or LEDs, are electrically coupled to a power source, such as the driver 370, current flows from the positive side to the negative side of each junction, causing charge carriers to release energy in the form of incoherent light.

The wavelength or color of the emitted light depends on the materials used to make the LED die packages 185, or LEDs. For example, a blue or ultraviolet LED typically includes gallium nitride ("GaN") or indium gallium nitride ("InGaN"), a red LED typically includes aluminum gallium arsenide ("AlGaAs"), and a green LED typically includes aluminum gallium phosphide ("AlGaP"). Each of the LEDs in the LED die package 185 can produce the same or a distinct color of light. For example, in certain exemplary embodiments, the LED die package 185 includes one or more white LEDs and one or more non-white LEDs, such as red, yellow, amber, or blue LEDs, for adjusting the color temperature output of the light emitted from the fixture 100. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain exemplary embodiments, the emitted light includes substantially white light that seems slightly blue, green, red, yellow, orange, or some other color or tint. In certain exemplary embodiments, the light emitted from the LED die packages 185, or LEDs, has a color temperature between 2500 and 5000 degrees Kelvin.

In certain exemplary embodiments, an optically transmissive or clear material (not shown) encapsulates at least a portion of each LED die package 185, or LED. This encapsulating material provides environmental protection while transmitting light from the LED die package 185, or LED. In certain exemplary embodiments, the encapsulating material includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating white light. In certain exemplary embodiments, the white light has a color temperature between 2500 and 5000 degrees Kelvin.

In certain exemplary embodiments, the LED die packages 185, or LEDs, include one or more arrays of LED die packages 185, or LEDs, that are collectively configured to produce a lumen output from 1 lumen to 5000 lumens. The LED die packages 185, or LEDs, are attached to the substrate by one or more solder joints, plugs, epoxy or bonding lines, and/or other means for mounting an electrical/optical device on a surface. The substrate is electrically connected to support circuitry (not shown) and/or the driver 370 for supplying electrical power and control to the LED die packages 185, or LEDs. For example, one or more wires couple opposite ends of the substrate to the driver 370, thereby completing a circuit between the driver 370, the substrate, and the LED die packages 185, or LEDs. Hence, the wires electrically coupling the LED die packages 185, or LEDs, to the driver 370 are not visible to an observer standing below the LED fixture 100.

The LED fixture 100 is assembled according to various steps and methods. Although certain steps are described according to some exemplary embodiments, the order of the steps and/or methods is varied in other exemplary embodiments. According to some exemplary embodiments, the edges of the front panel 240 are substantially aligned with the side edges of the first fin 119, the second fin 120, the first outer arm 126, the first inner arm 129, the manifold base 138, the second outer arm 132, the second inner arm 135, the third fin 121, the fourth fin 122, and a portion of the platform 112 with the fitter 247 extending in a direction away from the manifold 307. The front panel 240 is positioned adjacent to the base 110 at these edges and is coupled to the base 110 by inserting the mounting hardware 190, such as a screw, through corresponding openings 446 and each of their respective screw tracks 123, 124, 302, 303. Although mounting hardwares 190 are used to couple the front panel 240 to the base 110, other fastening devices known to persons having ordinary skill in the art and having the benefit of the present disclosure are used in other exemplary embodiments. Once the front panel 240 is coupled adjacently to the base 110, the edges of the front panel 240 are sealed, which is water-tight and/or air tight, to the side edges of the first fin 119, the second fin 120, the first outer arm 126, the first inner arm 129, the manifold base 138, the second outer arm 132, the second inner arm 135, the third fin 121, the fourth fin 122, and a portion of the platform 112 using brazing methods. The brazing methods that are used include, but are not limited to, dip brazing, torch brazing, furnace brazing, vacuum brazing, braze welding, silver brazing, and cast iron welding. Once the brazing process is completed, the mounting hardwares 190 are optionally removed. Alternatively, in lieu of brazing the front panel 240 to the base 110, a gasket (not shown) is inserted between the front panel 240 and the side edges of the first fin 119, the second fin 120, the first outer arm 126, the first inner arm 129, the manifold base 138, the second outer arm 132, the second inner arm 135, the third fin 121, the fourth fin 122, and a portion of the platform 112 before the mounting hardwares 190 are used to couple the front panel 240 to the base 110. This gasket also provides a seal, which is air-tight and/or water-tight, between the front panel 240 and the base 110.

The edges of the rear panel 150 are substantially aligned with the side edges of the first fin 119, the second fin 120, the first outer arm 126, the first inner arm 129, the manifold base 138, the second outer arm 132, the second inner arm 135, the third fin 121, the fourth fin 122, and a portion of the platform 112. The rear panel 150 is positioned adjacent to the base 110 at these edges and facing the front panel 240. The rear panel 150 is coupled to the base 110 by inserting the mounting hardware 190, such as a screw, through corresponding openings 456 and each of their respective screw tracks 123, 124, 302, 303. Although mounting hardwares 190 are used to couple the rear panel 150 to the base 110, other fastening devices known to persons having ordinary skill in the art and having the benefit of the present disclosure are used in other exemplary embodiments. Once the rear panel 150 is coupled adjacently to the base 110, the edges of the rear panel 150 are sealed, which is water-tight and/or air tight, to the side edges of the first fin 119, the second fin 120, the first outer arm 126, the first inner arm 129, the manifold base 138, the second outer arm 132, the second inner arm 135, the third fin 121, the fourth fin 122, and a portion of the platform 112 using brazing methods. The brazing methods that are used include, but are not limited to, dip brazing, torch brazing, furnace brazing, vacuum brazing, braze welding, silver brazing, and cast iron welding. Once the brazing process is completed, the mounting hardwares 190 are optionally removed. Alternatively, in lieu of brazing the rear panel 150 to the base 110, a gasket (not shown) is inserted between the rear panel 150 and the side edges of the first fin 119, the second fin 120, the first outer arm 126, the first inner arm 129, the manifold base 138, the second outer arm 132, the second inner arm 135, the third fin 121, the fourth fin 122, and a portion of the platform 112 before the mounting hardwares 190 are used to couple the rear panel 150 to the base 110. This gasket also provides a seal, which is air-tight and/or water-tight, between the rear panel 150 and the base 110.

The driver 370 is inserted into the manifold 307 on the manifold base 138 and is optionally secured to the manifold base 138 using known securing techniques. The LED modules 180 are mounted onto the first surface 113 of the platform 112 using fastening devices, such as nails, screws, rivets, or adhesives, such that each of the openings 215 is covered by a respective LED module 180 when viewed from the side of the first surface 113. Each of the drivers 370 is electrically coupled to one or more respective LED modules 180 using electrical wires extending from the drivers 370, into one of the wire ways 305, 306, through one of the openings 215, and to the LED module 180. According to some exemplary embodiments, one driver 370 is electrically coupled to three LED modules 180. Thus, when there are eight LED modules 180 mounted to the first surface 113, there are three drivers 370 inserted within the manifold 307 that are electrically coupled to these LED modules 180. However, in other exemplary embodiments, each driver 370 is electrically coupled to greater or fewer than three LED modules 180. Once the electrical wires have been coupled to the driver 370 and the LED modules 180, the cover 160 is disposed over the manifold 305 and rests upon the first outer arm distal end 328 and the second outer arm distal end 334. When coupling electrical wires to supply power to the drivers 370, the cover 160 is removed, the electrical wires are inserted through the aperture 245 and electrically coupled to the driver 370, and the cover 160 is replaced.

Figure 5:
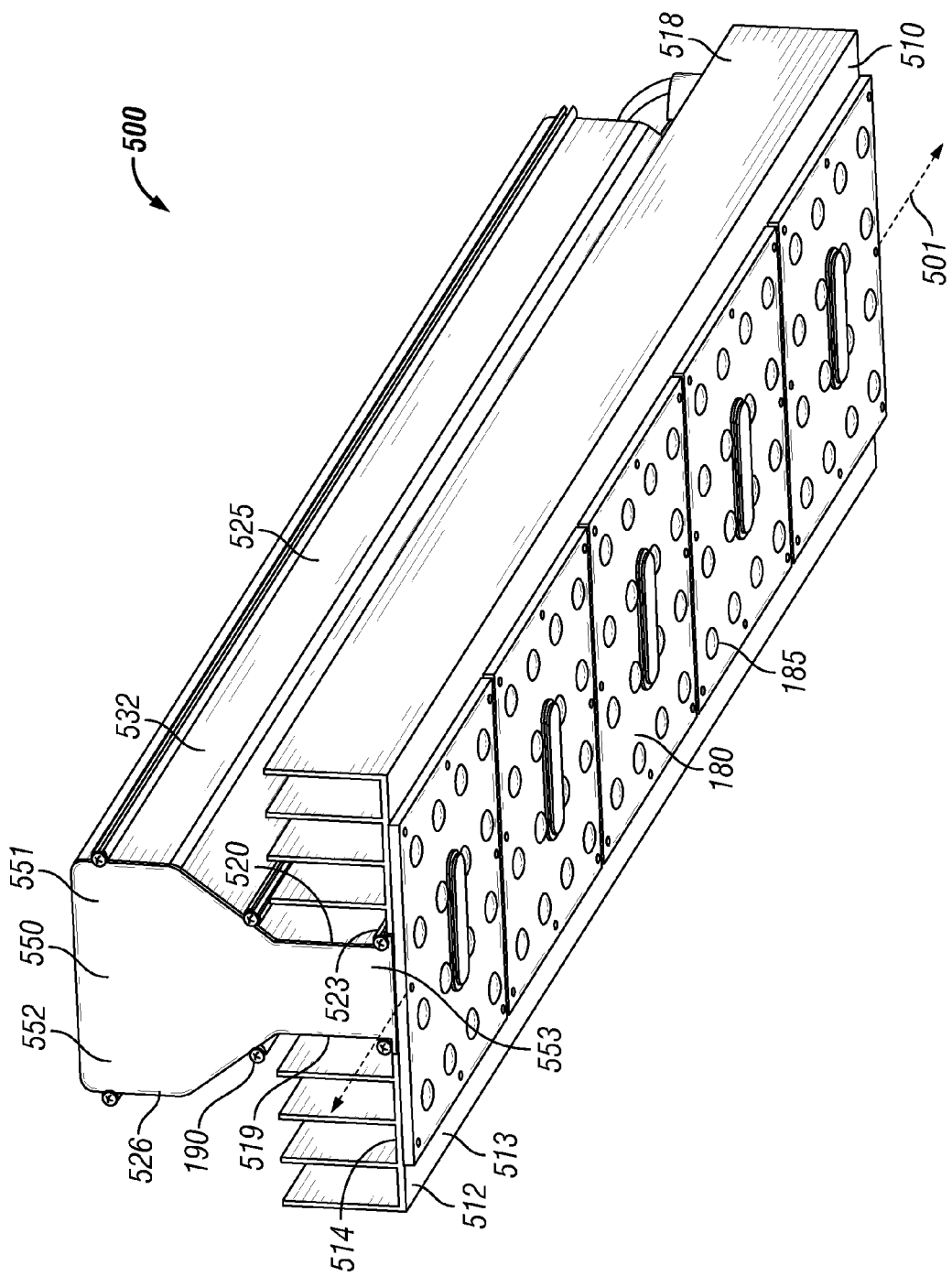
FIG. 5 shows a perspective view of an LED lighting fixture in accordance with a second exemplary embodiment of the present invention.
Figure 6:
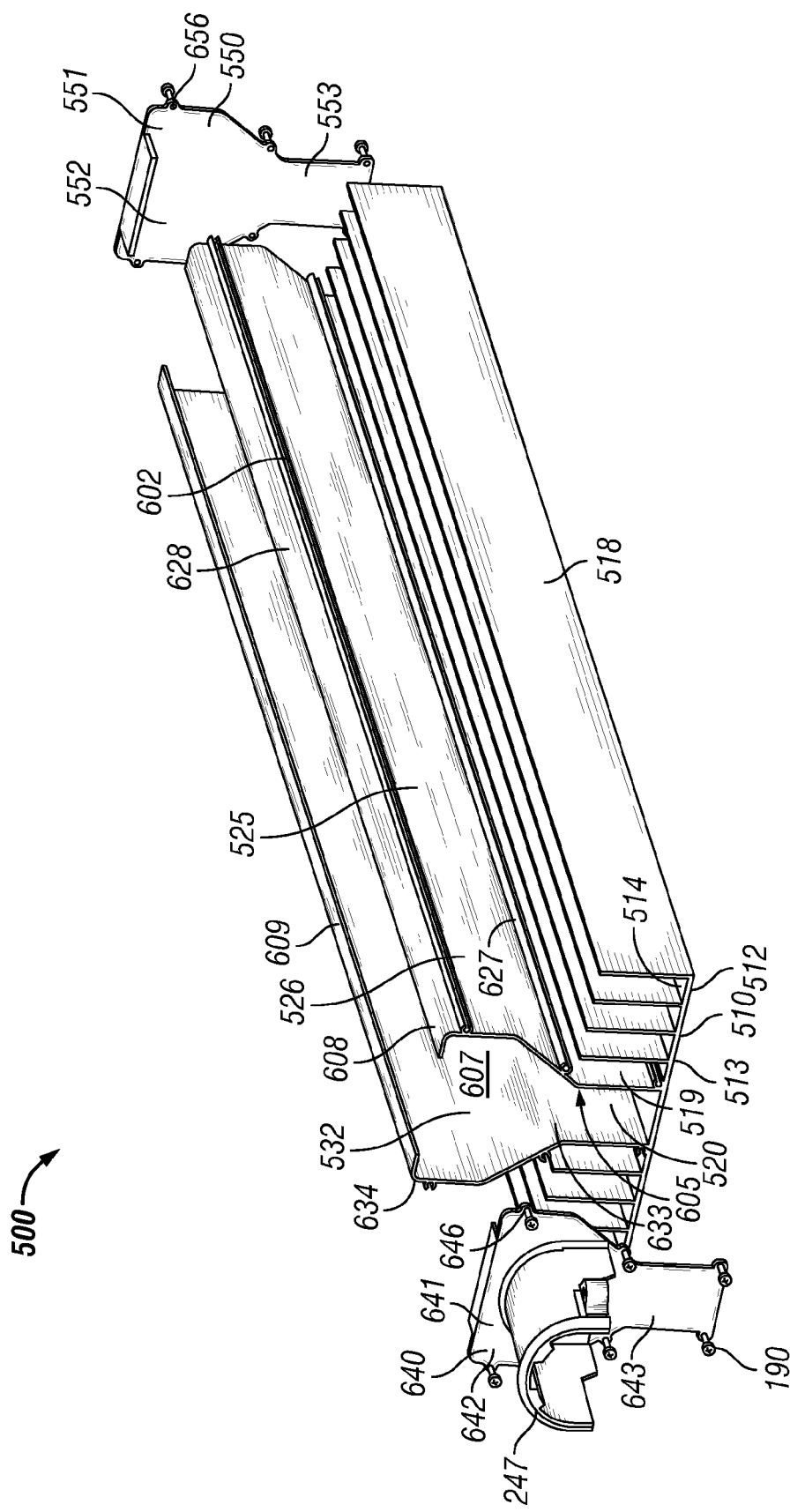
FIG. 6 shows an exploded view of the LED lighting fixture of FIG. 5 without the LED modules coupled thereto in accordance with the second exemplary embodiment of the present invention.

FIG. 5 shows a perspective view of an LED lighting fixture 500 in accordance with a second exemplary embodiment of the present invention. FIG. 6 shows an exploded view of the LED lighting fixture 500 without the LED modules 180 coupled thereto in accordance with the second exemplary embodiment of the present invention. Referring to FIGS. 5 and 6, the LED lighting fixture 500 includes a base 510, a front panel 640, a rear panel 550, a cover (not shown), one or more drivers (not shown), and one or more LED modules 180. Optionally, the LED lighting fixture 500 includes one or more mounting hardwares 190, such as screws, for permanently or temporarily coupling one or more of the previously mentioned components to at least one other previously mentioned component. Additionally, although not shown, the LED lighting fixture 500 also includes one or more electrical wires (not shown) electrically coupling each driver to one or more LED modules 180.

The base 510 includes a platform 512, one or more fins 518, and a manifold chamber 525. The platform 512 is substantially planar and includes a first surface 513 facing one direction and a second surface 514 facing an opposite direction. The platform 512 also includes one or more openings (not shown), which are similar to openings 215 (FIG. 2), extending from the first surface 513 to the second surface 514. These openings provide a pathway for the electrical wires to electrically couple the driver to the one or more LED modules 180, which is discussed in further detail below. According to some exemplary embodiments, several openings are formed along the length of the platform 512 in substantially a first linear orientation (not shown). The platform 512 is substantially rectangularly shaped, but is shaped differently, such as being circularly shaped, in other exemplary embodiments. In certain exemplary embodiments, the openings are oriented in one or more circular patterns or other orientation type. The platform 512 is fabricated from aluminum and is extruded in certain exemplary embodiments; however, the platform 512 is fabricated using other suitable materials and/or using other suitable manufacturing processes that are known to persons having ordinary skill in the art and having the benefit of the present disclosure.

The base 510 includes one or more fins 518 extending substantially perpendicularly away from the second surface 514. According to certain exemplary embodiments, each fin 518 extends substantially parallel to one another and substantially linear along the length of the platform 512. The fins 518 also are substantially equidistantly spaced apart in some exemplary embodiments, while in others, the fins 518 are spaced apart one or more different distances. In other exemplary embodiments, the fins 518 are not linear along the length of the platform 512. In some exemplary embodiments, the fins 518 include a first fin 519 and a second fin 520. The first fin 519 and the second fin 520 are adjacently positioned to one another, according to some exemplary embodiments, and are positioned so that the first linear orientation is disposed between the first fin 519 and the second fin 520. According to certain exemplary embodiments, the openings disposed between the first fin 519 and the second fin 520 are aligned along a central axis 501 of the LED lighting fixture 500. According to some exemplary embodiments, each of the first fin 519 and the second fin 520 includes one or more screw tracks 523 that extend along the length of each of the first fin 519 and the second fin 520 and is disposed at similar and/or different elevated distances away from the second surface 514. However, one or more of the screw tracks 523 extend non-continuously and/or at different elevations along the length of the first fin 519 and/or the second fin 520 in certain exemplary embodiments. Each of these screw tracks 523 is capable of receiving a respective mounting hardware 190, which is discussed in further detail below. In some instances where the platform 512 is circularly shaped, the fins 518 also are circularly shaped, in some exemplary embodiments, and aligned concentrically to one another. The fins 518 are fabricated from aluminum and are extruded in certain exemplary embodiments; however, the fins 518 are fabricated using other suitable materials and/or using other suitable manufacturing processes that are known to persons having ordinary skill in the art and having the benefit of the present disclosure. The fins 518 are fabricated with the platform 512 as a single component, but are fabricated separately in other exemplary embodiments. Also, each of the screw tracks 523 is also formed using an extrusion process according to certain exemplary embodiments.

The manifold chamber 525 includes a first arm 526 and a second arm 532. The first arm 526 includes a first arm adjacent end 627 and a first arm distal end 628 and extends outwardly from an end of the first fin 519 along its length in a direction that is further away from the second surface 514. The first arm 526 extends at an angle from the first fin 519 in a direction that is outwardly away from the middle area of the base 510. However, in other exemplary embodiments, the first arm 526 extends from the end of the first fin 519 in a linear direction that is further away from the second surface 514 such that the first fin 519 and the first arm 526 form a 180 degree angle or extends from the end of the first fin 519 in a direction that is further away from the second surface 514 and outwardly towards the middle area of the base 510. According to some exemplary embodiments, the first arm 526 also includes a first arm flange 608 that extends inwardly towards the middle area of the base 510 from the length of the first arm distal end 628. According to some exemplary embodiments, the first arm 526 includes one or more screw tracks 602 that extend along its length and is disposed at different elevated distances away from the first fin 519. However, one or more of the screw tracks 602 extend non-continuously and/or at different elevations along the length of the first arm 526 in certain exemplary embodiments. Each of the screw tracks 602 is capable of receiving a respective mounting hardware 190, which is discussed in further detail below. These screw tracks 602 are formed using an extrusion process according to certain exemplary embodiments, but can be formed using other known methods. Although two screw tracks 602 are shown on the first arm 526, greater or fewer screw tracks are used in other exemplary embodiments.

The second arm 532 includes a second arm adjacent end 633 and a second arm distal end 634 and extends outwardly from an end of the second fin 520 along its length in a direction that is further away from the second surface 514. The second arm 532 extends at an angle from the second fin 520 in a direction that is outwardly away from the middle area of the base 510. However, in other exemplary embodiments, the second arm 532 extends from the end of the second fin 520 in a linear direction that is further away from the second surface 514 such that the second fin 520 and the second arm 532 form a 180 degree angle or extends from the end of the second fin 520 in a direction that is further away from the second surface 514 and inwardly towards the middle area of the base 510. The second arm distal end 634 lies in a substantially horizontal plane that includes the first arm distal end 628 according to certain exemplary embodiments. According to some exemplary embodiments, the second arm 532 also includes a second arm flange 609 that extends inwardly towards the middle area of the base 510 from the length of the second arm distal end 634. According to some exemplary embodiments, the second arm 532 also includes one or more screw tracks 602 that extend along its length and is disposed at different elevated distances away from the second fin 520. However, one or more of the screw tracks 602 extend non-continuously and/or at different elevations along the length of the second arm 532 in certain exemplary embodiments. Each of the screw tracks 602 is capable of receiving a respective mounting hardware 190, which is discussed in further detail below. These screw tracks 602 are formed using an extrusion process according to certain exemplary embodiments, but can be formed using other known methods. Although two screw tracks 602 are shown on the second arm 532, greater or fewer screw tracks are used in other exemplary embodiments.

A wire way 605 is formed between the first fin 519 and the second fin 520. The wire way 605 provides a pathway for electrical wires to proceed from the drivers (not shown), through the openings of the platform 512, and to the one or more LED modules 180. A manifold 607 is formed between the first arm 526 and the second arm 532. The manifold 607 is communicably coupled to the wire way 605.

The front panel 640 includes a base portion 641 and a fitter 247 extending outwardly from the base portion 641. The base portion 641 is substantially planar according to certain exemplary embodiments and includes a body 642 and a leg 643 extending downward from the body 642. The base portion 641 is shaped substantially according to the shape defined by the side edges of the first fin 519, the second fin 520, the first arm 526, the second arm 532, and a portion of the platform 512. Specifically, the leg 643 is shaped substantially according to the shape defined by the side edges of the first fin 519, the second fin 520, and a portion of the platform 512. Additionally, the body 642 is shaped substantially according to the shape defined by the side edges of the first arm 526 and the second arm 532. The base portion 641 also includes an aperture (not shown), which is similar to aperture 245 (FIG. 2), that extends through the base portion 641 and allows for electrical wires to pass through from an exterior power source (not shown) to the drivers positioned within the manifold chamber 525. The base portion 641 also includes one or more openings 646 formed therethrough which each align with a respective screw track 523, 602. These openings 646 are configured to receive mounting hardwares 190 that facilitate permanently coupling and/or temporarily holding the front panel 640 adjacent to the base 510.

The fitter 247 extends orthogonally away from the base portion 641 and couples to a mounting structure (not shown), such as a pole. The fitter 247 is semi-circular in shape and is positioned partially surrounding the aperture formed in the body 642, but is shaped differently in other exemplary embodiments. According to certain exemplary embodiments, the front panel 640 is fabricated from aluminum and is extruded as a single component. However, in other exemplary embodiments, the front panel 640 is fabricated using other suitable materials and/or is formed using other processes known to persons having ordinary skill in the art and having the benefit of the present disclosure. Additionally, in other exemplary embodiments, the front panel 640 is formed from multiple components that are assembled together thereafter.

The rear panel 550 includes a base portion 551 similar to base portion 641. The base portion 551 is substantially planar according to certain exemplary embodiments and includes a body 552 and a leg 553 extending downward from the body 552. The base portion 551 is shaped substantially according to the shape defined by the side edges of the first fin 519, the second fin 520, the first arm 526, the second arm 532, and a portion of the platform 512. Specifically, the leg 553 is shaped substantially according to the shape defined by the side edges of the first fin 519, the second fin 520, and a portion of the platform 512. Additionally, the body 552 is shaped substantially according to the shape defined by the side edges of the first arm 526 and the second arm 532. The base portion 551 also includes one or more openings 656 formed therethrough, which each align with a respective screw track 523, 602. These openings 656 are configured to receive mounting hardwares 190 that facilitate permanently coupling and/or temporarily holding the rear panel 550 adjacent to the base 510. According to certain exemplary embodiments, the rear panel 550 is fabricated from aluminum and is extruded as a single component. However, in other exemplary embodiments, the rear panel 550 is fabricated using other suitable materials and/or is formed using other processes known to persons having ordinary skill in the art and having the benefit of the present disclosure. Additionally, in other exemplary embodiments, the rear panel 550 is formed from multiple components that are assembled together thereafter.

The cover (not shown) is similar to cover 160 (FIG. 1), but is dimensioned to be placed on top of and over the first arm distal end 628, the second arm distal end 634, and the upper portions of the front panel 640 and the rear panel 550. According to certain exemplary embodiments, the cover is fabricated from aluminum and is extruded as a single component. However, in other exemplary embodiments, the cover is fabricated using other suitable materials and/or is formed using other processes known to persons having ordinary skill in the art and having the benefit of the present disclosure. Additionally, in other exemplary embodiments, the cover is formed from multiple components that are assembled together thereafter.

Although the driver is not illustrated, the driver is similar to the driver 370 (FIG. 3). The driver is electrically communicable with the one or more LED modules 180 using one or more electrical wires that pass through the wire way 605 and is also electrically coupled to the electrical wires routed into the manifold chamber 525 from the aperture formed in the front panel 640. The driver provides power to the one or more LED modules 180 and also controls the intensity and/or color of one or more LEDs 185 within the LED modules 180. For example, the driver is capable of dimming the LEDs 185 if desired. The driver produces heat which is removed from within the manifold chamber 525 to an external area outside of the LED light fixture 500 via the fins 518. The driver is inserted into the manifold chamber 525 and is in contact with portions of the first arm 628 and the second arm 532, which is in contact with one or more fins 518. The driver is disposed above the first fin 519 and the second fin 520. However, in other exemplary embodiments, the driver is coupled within the manifold chamber 525 and is in thermal communication with one or more fins 518 without departing from the scope and spirit of the exemplary embodiment.

According to this exemplary embodiment, the LED modules 180 include one or more LED die packages 185, or LEDs, and are fabricated, mounted, and operated according to the description provided with respect to FIGS. 1-4. The LED die packages 185, or LEDs, are arranged in a four by four array, but can be arranged in a different pattern or randomly in other exemplary embodiments.

The LED fixture 500 is assembled according to various steps and methods. Although certain steps are described according to some exemplary embodiments, the order of the steps and/or methods is varied in other exemplary embodiments. According to some exemplary embodiments, the edges of the front panel 640 are substantially aligned with the side edges of the first fin 519, the second fin 520, the first arm 526, the second arm 532, and a portion of the platform 512 with the fitter 247 extending in a direction away from the manifold 607. The front panel 640 is positioned adjacent to the base 510 at these edges and is coupled to the base 510 by inserting the mounting hardware 190, such as a screw, through corresponding openings 646 and each of their respective screw tracks 523, 602. Although mounting hardwares 190 are used to couple the front panel 640 to the base 510, other fastening devices known to persons having ordinary skill in the art and having the benefit of the present disclosure are used in other exemplary embodiments. Once the front panel 640 is coupled adjacently to the base 510, the edges of the front panel 640 are sealed, which is water-tight and/or air tight, to the side edges of the first fin 519, the second fin 520, the first arm 526, the second arm 532, and a portion of the platform 512 using brazing methods. The brazing methods that are used include, but are not limited to, dip brazing, torch brazing, furnace brazing, vacuum brazing, braze welding, silver brazing, and cast iron welding. Once the brazing process is completed, the mounting hardwares 190 are optionally removed. Alternatively, in lieu of brazing the front panel 640 to the base 510, a gasket (not shown) is inserted between the front panel 640 and the side edges of the first fin 519, the second fin 520, the first arm 526, the second arm 532, and a portion of the platform 512 before the mounting hardwares 190 are used to couple the front panel 640 to the base 510.

This gasket also provides a seal, which is air-tight and/or water-tight, between the front panel 640 and the base 510.

The edges of the rear panel 550 are substantially aligned with the side edges of the first fin 519, the second fin 520, the first arm 526, the second arm 532, and a portion of the platform 512. The rear panel 550 is positioned adjacent to the base 510 at these edges and facing the front panel 640. The rear panel 550 is coupled to the base 510 by inserting the mounting hardware 190, such as a screw, through corresponding openings 656 and each of their respective screw tracks 523, 602. Although mounting hardwares 190 are used to couple the rear panel 550 to the base 510, other fastening devices known to persons having ordinary skill in the art and having the benefit of the present disclosure are used in other exemplary embodiments. Once the rear panel 550 is coupled adjacently to the base 510, the edges of the rear panel 550 are sealed, which is water-tight and/or air tight, to the side edges of the first fin 519, the second fin 520, the first arm 526, the second arm 532, and a portion of the platform 512 using brazing methods. The brazing methods that are used include, but are not limited to, dip brazing, torch brazing, furnace brazing, vacuum brazing, braze welding, silver brazing, and cast iron welding. Once the brazing process is completed, the mounting hardwares 190 are optionally removed. Alternatively, in lieu of brazing the rear panel 550 to the base 510, a gasket (not shown) is inserted between the rear panel 550 and the side edges of the first fin 519, the second fin 520, the first arm 526, the second arm 532, and a portion of the platform 512 before the mounting hardwares 190 are used to couple the rear panel 550 to the base 510. This gasket also provides a seal, which is air-tight and/or water-tight, between the rear panel 550 and the base 510.

The driver is inserted into the manifold 607 and is optionally secured to at least one of the first arm 628 and/or the second arm 532 using known securing techniques. The LED modules 180 are mounted onto the first surface 513 of the platform 512 using fastening devices, such as nails, screws, rivets, or adhesives, such that each of the openings of the platform 512 is covered by a respective LED module 180 when viewed from the side of the first surface 513. Each of the drivers is electrically coupled to one or more respective LED modules 180 using electrical wires extending from the drivers, into the wire way 605, through one of the openings of the platform 512, and to the LED modules 180. According to some exemplary embodiments, one driver is electrically coupled to three LED modules 180. Thus, when there are five LED modules 180 mounted to the first surface 513, there are two drivers inserted within the manifold 607 that are electrically coupled to these LED modules 180. However, in other exemplary embodiments, each driver is electrically coupled to greater or fewer than three LED modules 180. Once the electrical wires have been coupled to the driver and the LED modules 180, the cover is disposed over the manifold 605 and rests upon the first arm distal end 628 and the second arm distal end 634. When coupling electrical wires to supply power to the drivers, the cover is removed, the electrical wires are inserted through the aperture formed within the front panel 640 and electrically coupled to the driver, and the cover is replaced. The wires coupling the LED modules 180 to the driver are not visible to an observer standing below the LED fixture 500.

Figure 7:
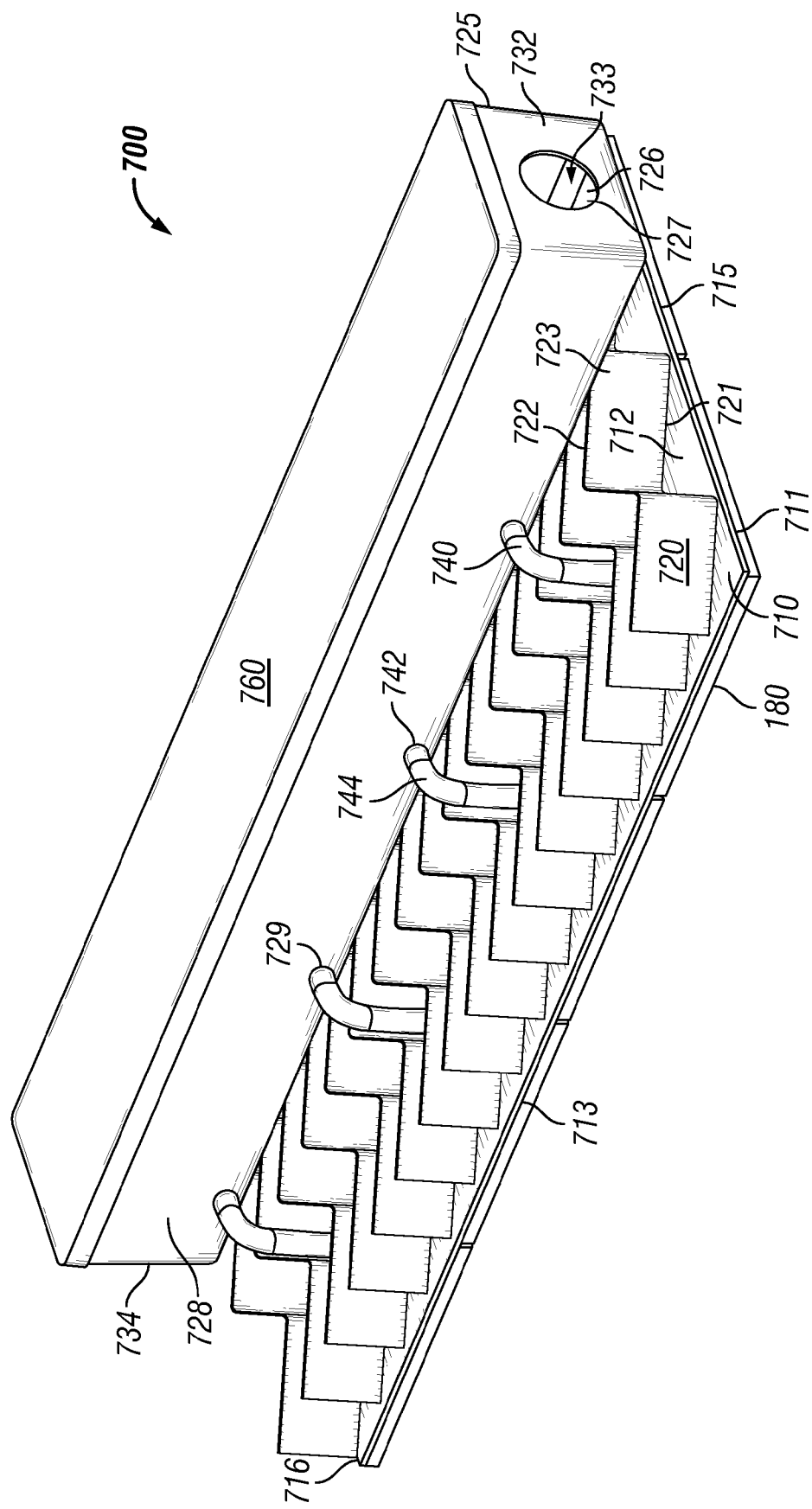
FIG. 7 shows a perspective view of an LED lighting fixture in accordance with a third exemplary embodiment of the present invention.
Figure 8:
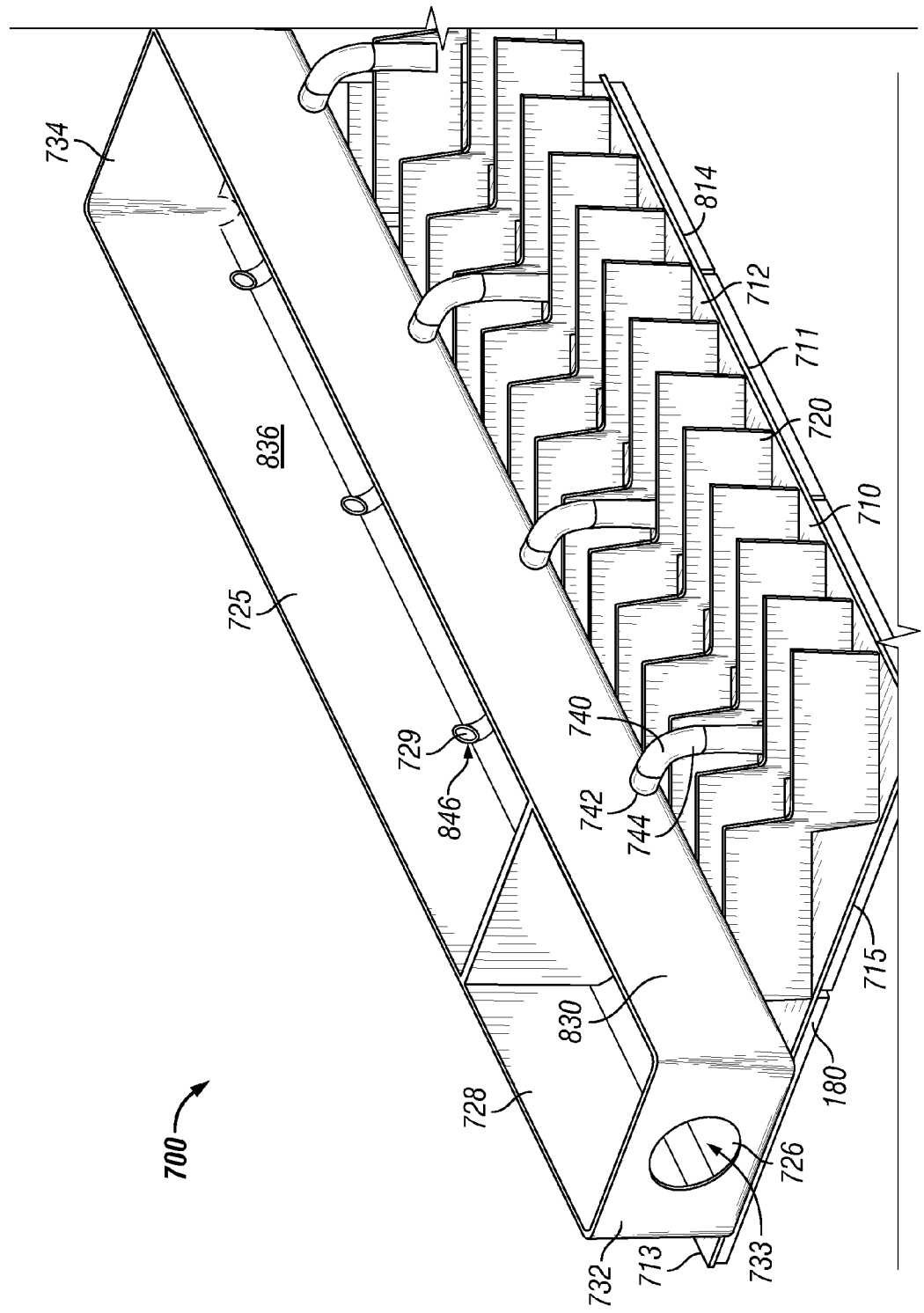
FIG. 8 shows a perspective view of the LED lighting fixture of FIG. 7 without the cover in accordance with the third exemplary embodiment of the present invention.
Figure 9:
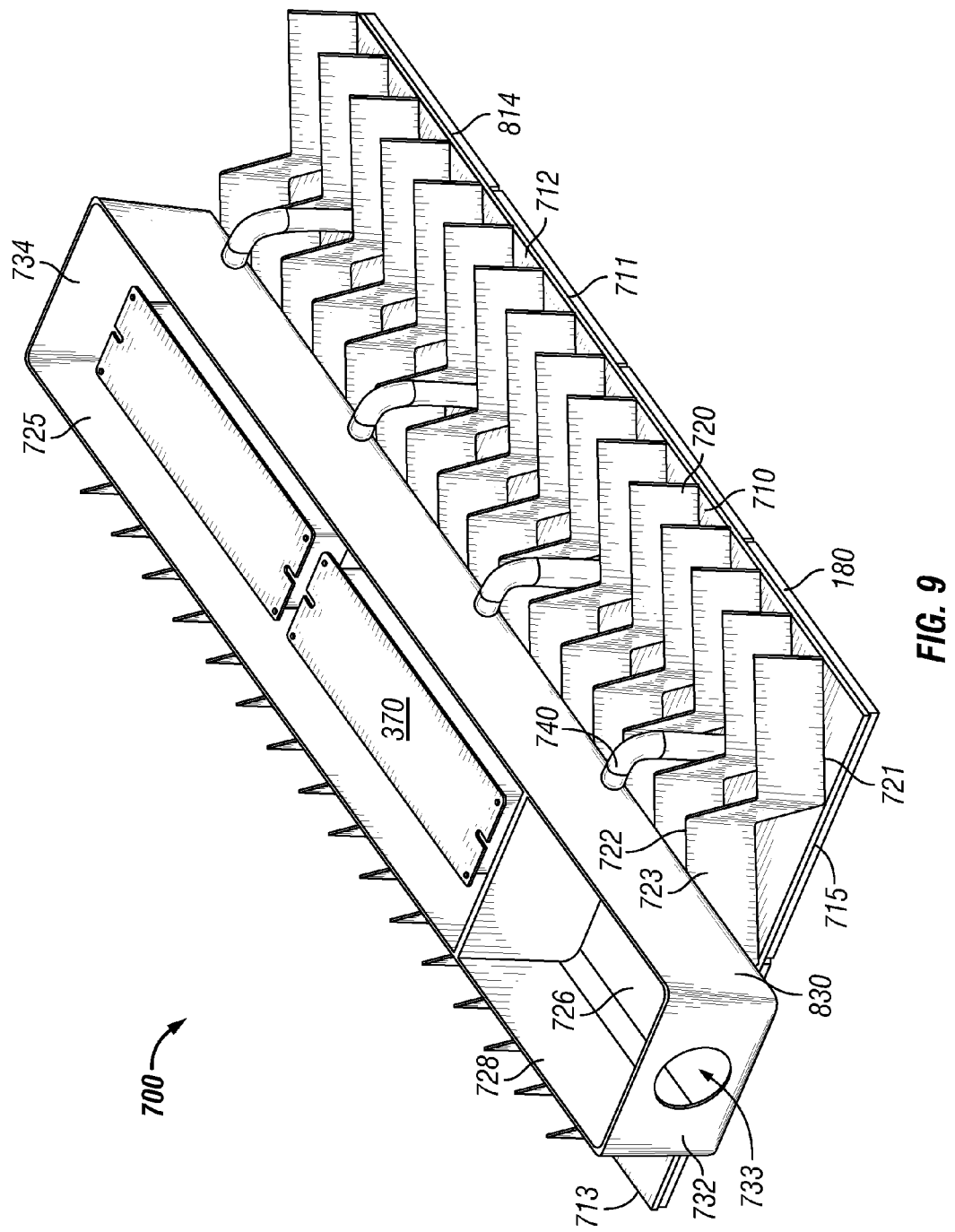
FIG. 9 shows a perspective view of the LED lighting fixture of FIG. 8 with one or more drivers inserted into a manifold chamber in accordance with the third exemplary embodiment of the present invention.

FIG. 7 shows a perspective view of an LED lighting fixture 700 in accordance with a third exemplary embodiment of the present invention. FIG. 8 shows a perspective view of the LED lighting fixture 700 without the cover 760 in accordance with the third exemplary embodiment of the present invention. FIG. 9 shows a perspective view of the LED lighting fixture 700 without the cover 760 and with one or more drivers 370 inserted into a manifold chamber 725 in accordance with the third exemplary embodiment of the present invention. Referring to FIGS. 7-9, the LED lighting fixture 700 includes a base 710, one or more fins 720, a manifold chamber 725, one or more elbows 740, a cover 760, one or more drivers 370, and one or more LED modules 180. Additionally, although not shown, the LED lighting fixture 700 also includes one or more electrical wires (not shown) electrically coupling each driver 370 to one or more LED modules 180.

The base 710 is substantially planar and includes a first surface 711 facing one direction and a second surface 712 facing an opposite direction. The base 710 also includes a first longitudinal edge 713, a second longitudinal edge 814, a first latitudinal edge 715 extending from one end of the first longitudinal edge 713 to an end of the second longitudinal edge 814, and a second latitudinal edge 716 extending from an opposing end of the first longitudinal edge 713 to an opposing end of the second longitudinal edge 814. According to some exemplary embodiments, the first longitudinal edge 713 is substantially parallel to the second longitudinal edge 814. Similarly, in certain exemplary embodiments, the first latitudinal edge 715 is substantially parallel to the second latitudinal edge 716. The base 710 also includes one or more openings (not shown), similar to openings 215 (FIG. 2), extending from the first surface 711 to the second surface 712. These openings provide a pathway for the electrical wires to electrically couple the driver 370 to the one or more LED modules 180, which is discussed in further detail below. According to some exemplary embodiments, several openings are formed along the length of the base 710 in substantially a first linear orientation (not shown). According to some exemplary embodiments, several openings also are formed along the length of the base 710 in substantially a second linear orientation (not shown). In other exemplary embodiments, the openings are aligned in more than two orientations, either linear or non-linear. Alternatively, the openings are aligned in one or more orientations that extend along the width of the base 710. The second linear orientation is aligned substantially parallel with respect to the first linear orientation, but can be aligned differently in other exemplary embodiments. According to some exemplary embodiments, the second surface 712 includes a plurality of grooves (not shown) formed therein to receive a portion of the fins 720. The base 710 is substantially rectangularly shaped, but is shaped differently, such as being circularly shaped, in other exemplary embodiments. In certain exemplary embodiments, the openings are oriented in one or more circular patterns or other orientation type. The base 710 is fabricated from aluminum and is extruded in certain exemplary embodiments; however, the base 710 is fabricated using other suitable materials, such as copper, and/or using other suitable manufacturing processes that are known to persons having ordinary skill in the art and having the benefit of the present disclosure.

The fins 720 include a first side edge 721, a second side edge 722, and a surface 723 extending from the first side edge 721 to the second side edge 722. The fins 720 are corrugated-shaped, or zigzag shaped, according to some exemplary embodiments, but are shaped differently in other exemplary embodiments. The first side edge 721 of each fin 720 is positioned adjacent to the second surface 712 such that the second side edge 722 is positioned away from the second surface 712. According to certain exemplary embodiments, one or more fins 720 extend substantially perpendicular away from the second surface 712, while in other embodiments, one or more fins 720 extend substantially non-perpendicular from the second surface 712. The first side edge 721 is inserted securely into the grooves formed within the second surface 712 according to some exemplary embodiments. However, the fins 720 are secured to the base 710 in a different manner, such as by being snap fitted. According to certain exemplary embodiments, each portion of the fin 720 extends substantially parallel to a respective portion of another fin 720 and substantially along the width of the base 710. However, one or more fins 720 are oriented in a different direction than the width of the base 710. The fins 720 also are substantially equidistantly spaced apart in some exemplary embodiments, while in others, the fins 720 are spaced apart one or more different distances. According to certain exemplary embodiments, one or more openings formed within the base 710 are disposed between different adjacently positioned fins 720. In some instances where the base 710 is circularly shaped, the fins 720 also are circularly shaped, in some exemplary embodiments, and aligned concentrically to one another. The fins 720 are fabricated from aluminum and are extruded in certain exemplary embodiments; however, the fins 720 are fabricated using other suitable conductive materials and/or using other suitable manufacturing processes that are known to persons having ordinary skill in the art and having the benefit of the present disclosure. The fins 720 are fabricated separately from the base 710 and thereafter assembled to one another, but are fabricated as a single component in other exemplary embodiments. According to some exemplary embodiments, the fins 720 are about two inches wide and range from about 20 thousandths inch thick at one edge of the fin 720 to about ninety thousandths thick at an opposing edge of the fin 720. However, the widths and thicknesses vary in other exemplary embodiments.

Figure 10:
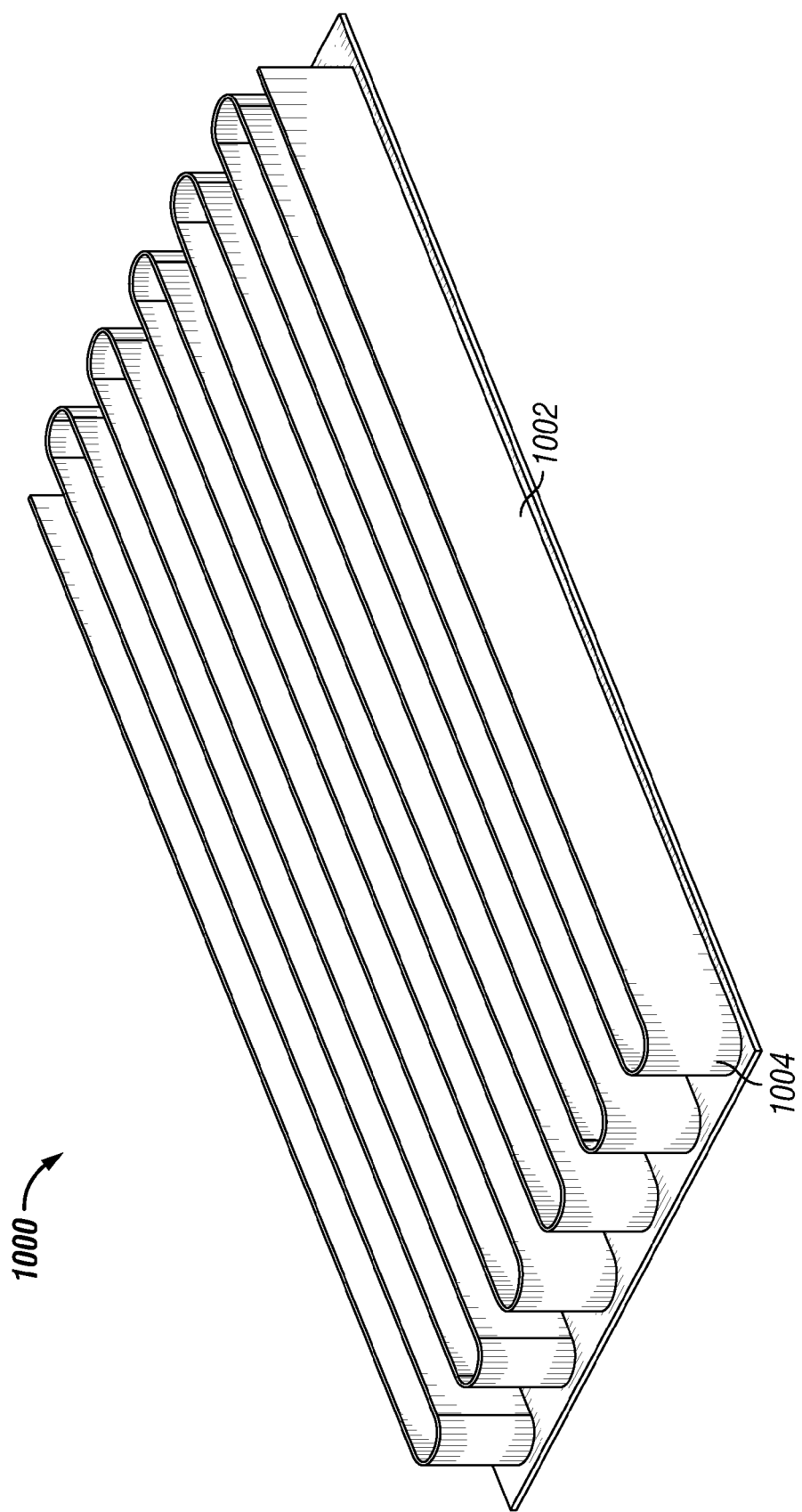
FIG. 10 shows a perspective view of an alternative fin assembly in accordance with another exemplary embodiment.

FIG. 10 shows a perspective view of alternative fin assembly 1000 in accordance with another exemplary embodiment. Referring to FIGS. 7-10, fin assembly 1000 is used in lieu of fins 720 in LED lighting fixture 700. Fin assembly 1000 is similar to fins 720 except that fin assembly 1000 is formed from a continuous material and is serpentine-shaped. Thus, the fin assembly 1000 includes a plurality of longitudinal sections 1002 and a plurality of curved sections 1004 which couple alternating adjacent ends of the longitudinal sections 1002 together to form the serpentine shape. According to this exemplary embodiments, the openings formed within the base 710 are disposed between adjacently positioned longitudinal sections 1002.

Referring back to FIGS. 7-9, the manifold chamber 725 includes a platform 726, a first longitudinal wall 728, a second longitudinal wall 830, a front wall 732, and a rear wall 734. The platform 726 is substantially planar, rectangular shaped, and includes an internal surface 727. However, in other exemplary embodiments, the platform 726 is non-planar and/or is shaped differently. The first longitudinal wall 728 extends outwardly from a longitudinal edge of the platform 726. The first longitudinal wall 728 is oriented substantially perpendicular with respect to the platform 726 according to certain exemplary embodiments. Additionally, the first longitudinal wall 728 includes one or more openings 729 formed therein and extending through the first longitudinal wall 728. The openings 729 provide a pathway for routing electrical wires (not shown) from the drivers 370 to the LED modules 180, which is discussed in further detail below. Similarly, the second longitudinal wall 830 extends outwardly from an opposing longitudinal edge of the platform 726 and faces the first longitudinal wall 728. The second longitudinal wall 830 is oriented substantially perpendicular with respect to the platform 726 according to certain exemplary embodiments. Additionally, the second longitudinal wall 830 also includes one or more openings 729 formed therein and extending through the second longitudinal wall 830. The front wall 732 extends from one end of the first longitudinal wall 728 to an end of the second longitudinal wall 830 and along a latitudinal edge of the platform 726. The front wall 732 is oriented substantially perpendicular with respect to the platform 726 according to certain exemplary embodiments. Additionally, the front wall 732 includes an aperture 733 formed therein and extending through the front wall 732. The aperture 733 provides a pathway for routing electrical wires into the manifold chamber 725 to the drivers 370 from a power source (not shown) located outside of the manifold chamber 725. Similarly, the rear wall 734 extends from an opposing end of the first longitudinal wall 728 to an opposing end of the second longitudinal wall 830 and along an opposing latitudinal edge of the platform 726. Thus, the rear wall 734 faces the front wall 732. The rear wall 734 is oriented substantially perpendicular with respect to the platform 726 according to certain exemplary embodiments. The platform 726, the first longitudinal wall 728, the second longitudinal wall 830, the front wall 732, and the rear wall 734 define a manifold 836 that houses the drivers 370 and at least portions of the electrical wires. The manifold chamber 725 is fabricated from aluminum, or some other suitable material, and is formed as a single component. Alternatively, the manifold chamber 725 is formed in several components and thereafter assembled together.

Each elbow 740 includes a first end 742, a second end (not shown), and a body 744 extending from the first end 742 to the second end and defining a wire way 846 extending within the body 744 from the first end 742 to the second end. The first end 742 of each elbow 740 is coupled to a corresponding opening 729 formed in the manifold chamber 725, while the second end is coupled to a corresponding opening formed in the base 710. Thus, elbows 740 extend from the first longitudinal wall 728 to the base 710 and from the second longitudinal wall 830 to the base 710. The wire way 846 provides a pathway for routing the electrical wires from the drivers 370 to the LED modules 180. Further, the elbows 740 provide one method for elevationally raising the platform 726 of the manifold chamber 725 above the top of the fins 720. However, in other exemplary embodiments, the manifold chamber 725 is in contact with the top of the fins 720. There are eight elbows 740 coupled between the manifold chamber 725 and the base 710 in the illustrated embodiment, seven of elbows 740 of which are shown. However, the number of elbows 740 is greater or fewer in other exemplary embodiments. The elbows 740 are fabricated form aluminum, or some other suitable material, using a method, such as extrusion, that is known to people having ordinary skill in the art and having the benefit of the present disclosure.

The cover 760 is similar to cover 160 (FIG. 1), but is dimensioned to be placed on top of and over the upper portions of the first longitudinal wall 728, the second longitudinal wall 830, the front wall 732, and the rear wall 734; thereby covering the manifold 836. According to certain exemplary embodiments, the cover 760 is fabricated from aluminum and is extruded as a single component. However, in other exemplary embodiments, the cover 760 is fabricated using other suitable materials and/or is formed using other processes known to persons having ordinary skill in the art and having the benefit of the present disclosure. Additionally, in other exemplary embodiments, the cover 760 is formed from multiple components that are assembled together thereafter.

The driver 370 is disposed within the manifold 836. The driver 370 is electrically communicable with the one or more LED modules 180 using one or more electrical wires that pass through the wire ways 846 and is also electrically coupled to the electrical wires routed into the manifold chamber 725 from the aperture 733 formed in the front wall 732. The driver 370 has been previously described with respect to FIGS. 1-4 and therefore is not repeated again. Additionally, according to this exemplary embodiment, the LED modules 180 include one or more LED die packages (not shown), or LEDs, and are fabricated, mounted, and operated according to the description provided with respect to FIGS. 1-4. Hence, the description of the LED modules 180 is not repeated herein.

The LED fixture 700 is assembled according to various steps and methods. Although certain steps are described according to some exemplary embodiments, the order of the steps and/or methods is varied in other exemplary embodiments. According to some exemplary embodiments, the fins 720 are mounted onto the second surface 712 of the base 710. The first end 742 of each elbow 740 is aligned with a corresponding opening 729 formed within the manifold chamber 725 and the second end of each elbow 740 is aligned with a corresponding opening formed within the base 710. Once aligned, and proper support is provided to the components to maintain their alignments and positioning, the first end 742 is sealed, which is water-tight and/or air tight, to the manifold chamber 725 using brazing methods. Similarly, the second end of the elbow 740 is sealed, which is water-tight and/or air tight, to the base 710 using brazing methods. The brazing methods that are used include, but are not limited to, dip brazing, torch brazing, furnace brazing, vacuum brazing, braze welding, silver brazing, and cast iron welding.

The driver 370 is inserted into the manifold 836 and rests upon the platform 726. Alternatively, the driver 370 is securely coupled to at least one of the first longitudinal wall 728, the second longitudinal wall 830, the front wall 732, and/or the rear wall 734. The LED modules 180 are mounted onto the first surface 711 of the base 710 using fastening devices, such as nails, screws, rivets, or adhesives, such that each of the openings of the base 710 is covered by a respective LED module 180 when viewed from the side of the first surface 711. Each of the drivers 370 is electrically coupled to one or more respective LED modules 180 using electrical wires extending from the drivers 370, into one of the wire ways 846, through one of the openings of the base 710 associated with that wire way 846, and to the LED module 180. According to some exemplary embodiments, one driver 370 is electrically coupled to three LED modules 180. Thus, when there are eight LED modules 180 mounted to the first surface 711, there are three drivers 370 inserted within the manifold 836 that are electrically coupled to these LED modules 180. However, in other exemplary embodiments, each driver 370 is electrically coupled to greater or fewer than three LED modules 180. Once the electrical wires have been coupled to the driver 370 and the LED modules 180, the cover 760 is disposed over the manifold 836 and rests upon the upper portions of the first longitudinal wall 728, the second longitudinal wall 830, the front wall 732, and the rear wall 734. When coupling electrical wires to supply power to the drivers 370, the cover 760 is removed, the electrical wires are inserted through the aperture 733 formed within the front wall 732 and electrically coupled to the driver 370, and the cover 760 is replaced.

Figure 11:
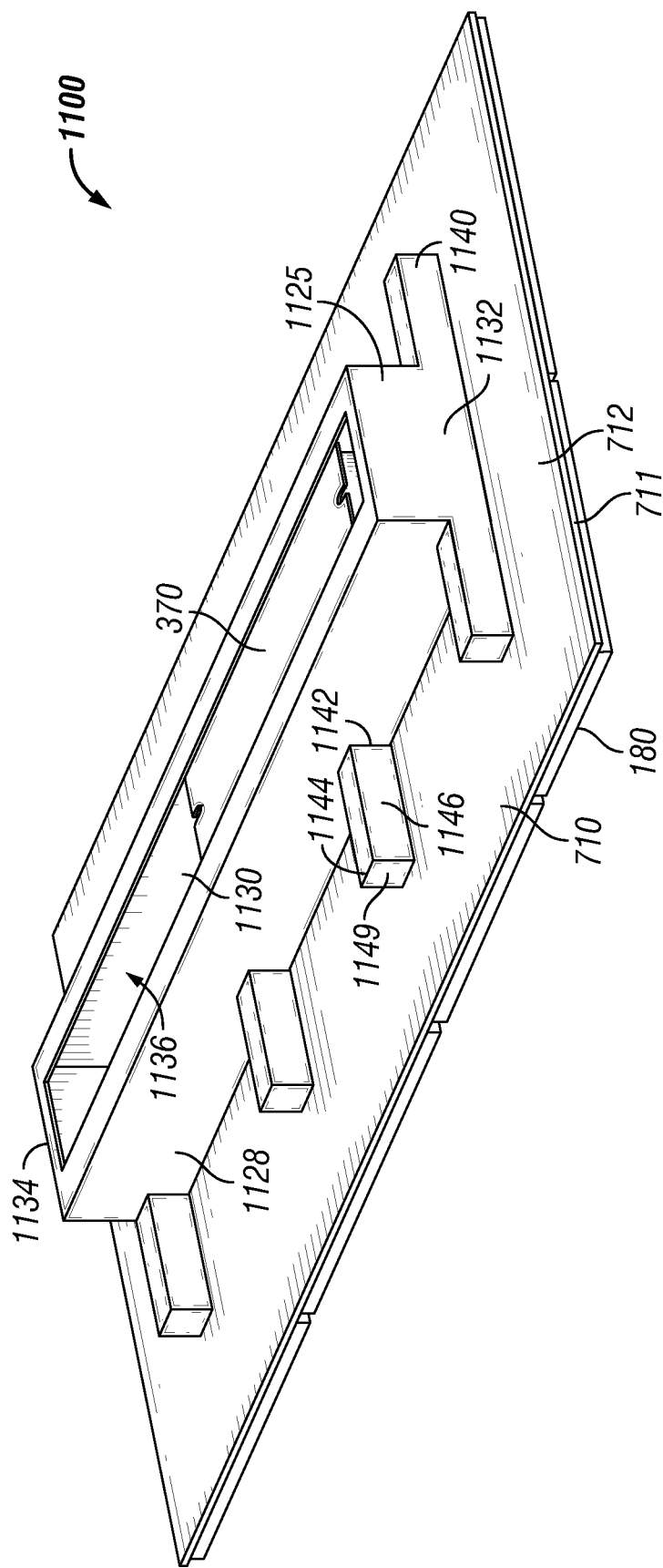
FIG. 11 shows a perspective view of an LED lighting fixture in accordance with a fourth exemplary embodiment of the present invention.

FIG. 11 shows a perspective view of an LED lighting fixture 1100 in accordance with a fourth exemplary embodiment of the present invention. Referring to FIG. 11, the LED lighting fixture 1100 includes a base 710, a manifold chamber 1125, one or more protrusions 1140, one or more drivers 370, and one or more LED modules 180. Additionally, although not shown, the LED lighting fixture 1100 also includes one or more electrical wires (not shown) electrically coupling each driver 370 to one or more LED modules 180. The base 710, the drivers 370, and the LED modules 180 have been previously described, and therefore not repeated again herein for the sake of brevity.

The manifold chamber 1125 is positioned adjacent to the base 710 and is in contact with the base 710. The manifold chamber 1125 includes a platform (not shown) in contact with the base 710, a first longitudinal wall 1128, a second longitudinal wall 1130, a front wall 1132, and a rear wall 1134. The platform is substantially planar and rectangular shaped. However, in other exemplary embodiments, the platform is non-planar and/or is shaped differently. The first longitudinal wall 1128 extends outwardly from a longitudinal edge of the platform. The first longitudinal wall 1128 is oriented substantially perpendicular with respect to the platform according to certain exemplary embodiments. Additionally, the first longitudinal wall 1128 includes one or more protrusions 1140 extending orthogonally away from the first longitudinal wall 1128 in a direction that is substantially opposite from the second longitudinal wall 1130. These protrusions 1140 are described more fully below. Similarly, the second longitudinal wall 1130 extends outwardly from an opposing longitudinal edge of the platform and faces the first longitudinal wall 1128. The second longitudinal wall 1130 is oriented substantially perpendicular with respect to the platform according to certain exemplary embodiments. Additionally, the second longitudinal wall 1130 also includes one or more protrusions 1140 extending orthogonally away from the second longitudinal wall 1130 in a direction that is substantially opposite from the first longitudinal wall 1128. The front wall 1132 extends from one end of the first longitudinal wall 1128 to an end of the second longitudinal wall 1130 and along a latitudinal edge of the platform. The front wall 1132 is oriented substantially perpendicular with respect to the platform according to certain exemplary embodiments. Similarly, the rear wall 1134 extends from an opposing end of the first longitudinal wall 1128 to an opposing end of the second longitudinal wall 1130 and along an opposing latitudinal edge of the platform. Thus, the rear wall 1134 faces the front wall 1132. The rear wall 1134 is oriented substantially perpendicular with respect to the platform according to certain exemplary embodiments. The platform, the first longitudinal wall 1128, the second longitudinal wall 1130, the front wall 1132, and the rear wall 1134 define a manifold 1136, which is open from above, that houses the drivers 370 and at least portions of the electrical wires. The electrical wires enter the manifold 1136 from an exterior of the manifold chamber 1125 through this above opening and supply power to the drivers 370. In certain exemplary embodiments, a cover (not shown) is placed on top of the manifold chamber 1125 to cover the manifold 1136. In some exemplary embodiments, at least one of the cover or a portion of the manifold chamber 1125 includes an opening that allows electrical wires to enter the manifold 1136 from an exterior of the manifold chamber 1125 and supply power to the drivers 370. The manifold chamber 1125 is fabricated from aluminum, or some other suitable material, and is formed as a single component. Alternatively, the manifold chamber 1125 is formed in several components and thereafter assembled together. According to some exemplary embodiments, the platform is optional.

Each protrusion 1140 includes a first end 1142, a second end 1144, and a body 1146 extending from the first end 1142 to the second end 1144 and defining a wire way (not shown) extending within the body 1146 from the first end 1142 towards the second end 1144. The wire way is communicable with the manifold 1136 and a corresponding opening formed in the base 710, which was previously described with respect to FIGS. 7-9. The bottom portion of each protrusion 1140 is in contact with the base 740. An end plate 1149 is coupled to the body 1146 at its second end 1144. According to certain exemplary embodiments, there are four protrusions 1140 extending away from the first longitudinal wall 1128 of the manifold chamber 1125; however, greater or fewer protrusions 1140 extend away from the first longitudinal wall 1128 in other exemplary embodiments. Similarly, there are four protrusions 1140 extending away from the second longitudinal wall 1130 of the manifold chamber 1125; however, greater or fewer protrusions 1140 extend away from the second longitudinal wall 1130 in other exemplary embodiments. According to some exemplary embodiments, the protrusions 1140 are formed integrally with the manifold chamber 1125 as a single component. Alternatively, the protrusions 1140 and the manifold chamber 1125 are separately formed and thereafter coupled to one another.

The LED lighting fixture 1100 is assembled according to various steps and methods. Although certain steps are described according to some exemplary embodiments, the order of the steps and/or methods is varied in other exemplary embodiments. According to some exemplary embodiments, the manifold chamber 1125 is mounted onto a second surface 712 of the base 710. Each protrusion 1140 is oriented to extend from the manifold chamber 1125 to the opening formed within the base 710, thereby providing a wire way that communicably extends from the manifold 1136 to the opening in the base 710. Once positioned, the bottom portions of the manifold chamber 1125 and the protrusions 1140 are sealed, which is water-tight and/or air tight, to the base 710 using brazing methods. The brazing methods that are used include, but are not limited to, dip brazing, torch brazing, furnace brazing, vacuum brazing, braze welding, silver brazing, and cast iron welding.

The driver 370 is inserted into the manifold 1136 and rests upon the platform. Alternatively, the driver 370 is securely coupled to at least one of the first longitudinal wall 1128, the second longitudinal wall 1130, the front wall 1132, and/or the rear wall 1134. The LED modules 180 are mounted onto a first surface 711 of the base 710 using fastening devices, such as nails, screws, rivets, or adhesives, such that each of the openings of the base 710 is covered by a respective LED module 180 when viewed from the side of the first surface 711. Each of the drivers 370 is electrically coupled to one or more respective LED modules 180 using electrical wires extending from the drivers 370, into one of the wire ways within the protrusions 1140, through one of the openings of the base 710 associated with that protrusion 1140, and to the respective LED module 180. According to some exemplary embodiments, one driver 370 is electrically coupled to three LED modules 180. Thus, when there are eight LED modules 180 mounted to the first surface 711, there are three drivers 370 inserted within the manifold 1136 that are electrically coupled to these LED modules 180. However, in other exemplary embodiments, each driver 370 is electrically coupled to greater or fewer than three LED modules 180.

Figure 12:
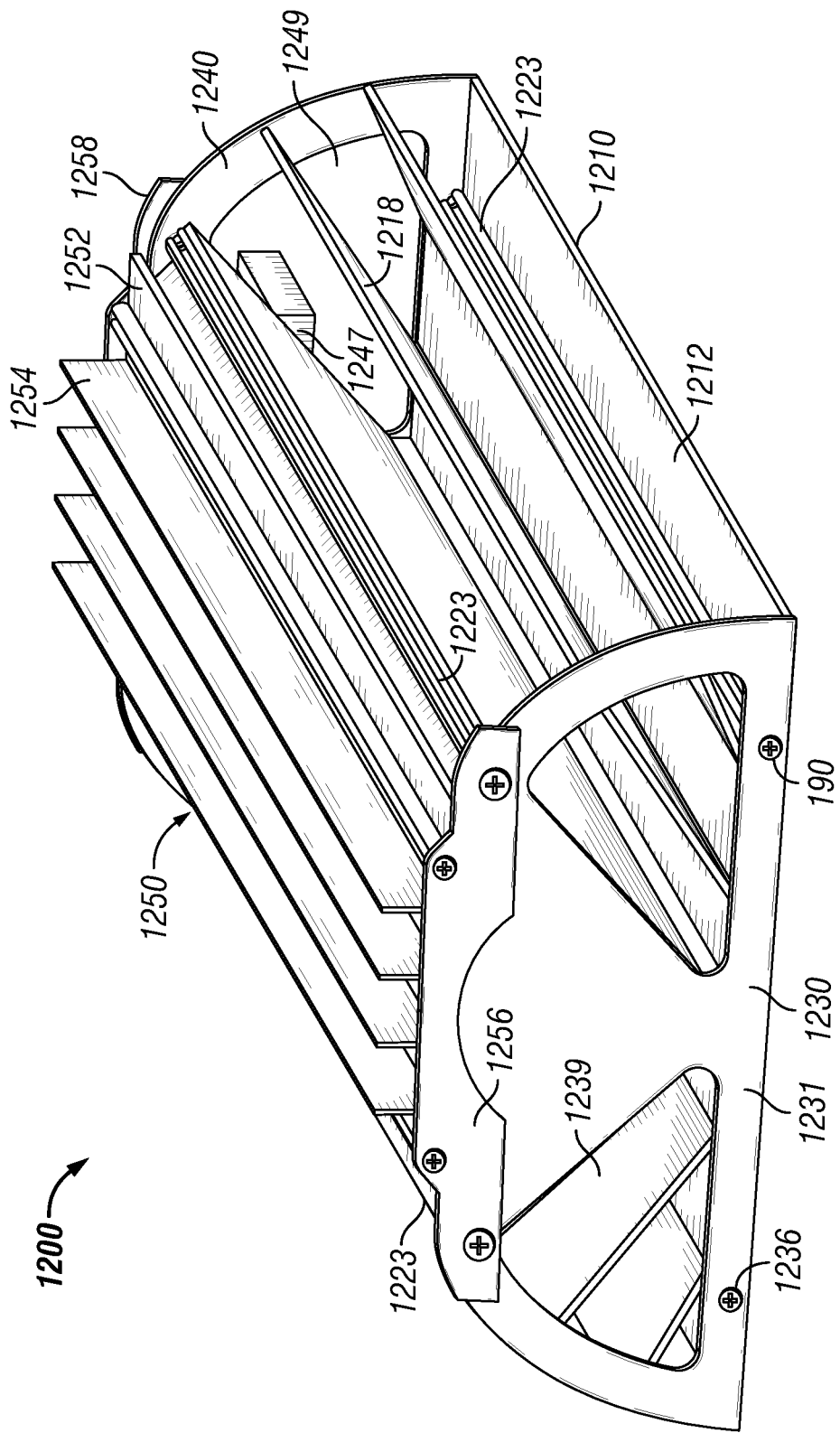
FIG. 12 shows a perspective view of an LED lighting fixture in accordance with a fifth exemplary embodiment of the present invention.
Figure 13:
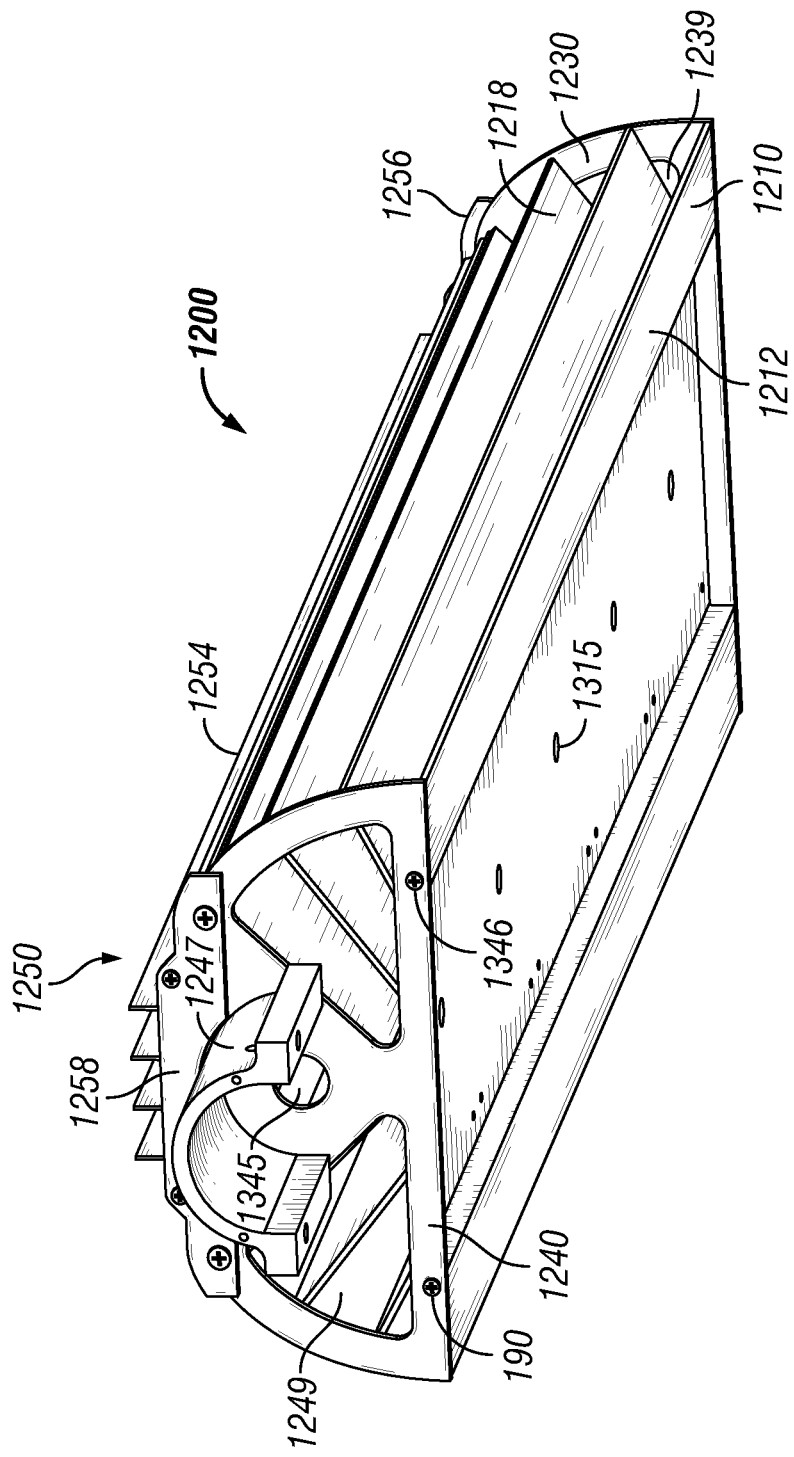
FIG. 13 shows another perspective view of the LED lighting fixture of FIG. 11 in accordance with the fifth exemplary embodiment of the present invention.
Figure 14:
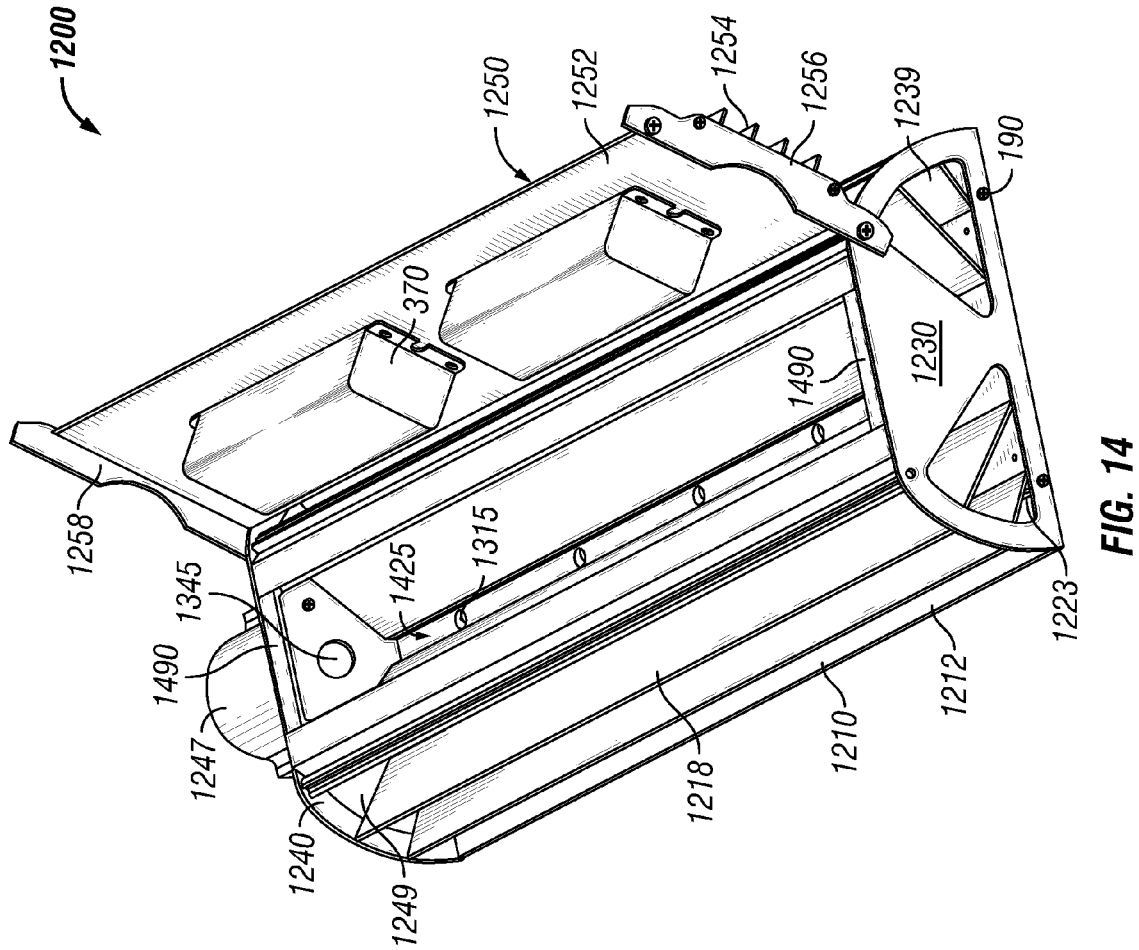
FIG. 14 shows another perspective view of the LED lighting fixture of FIG. 12 with a door positioned in an open position in accordance with the fifth exemplary embodiment of the present invention.
Figure 15:
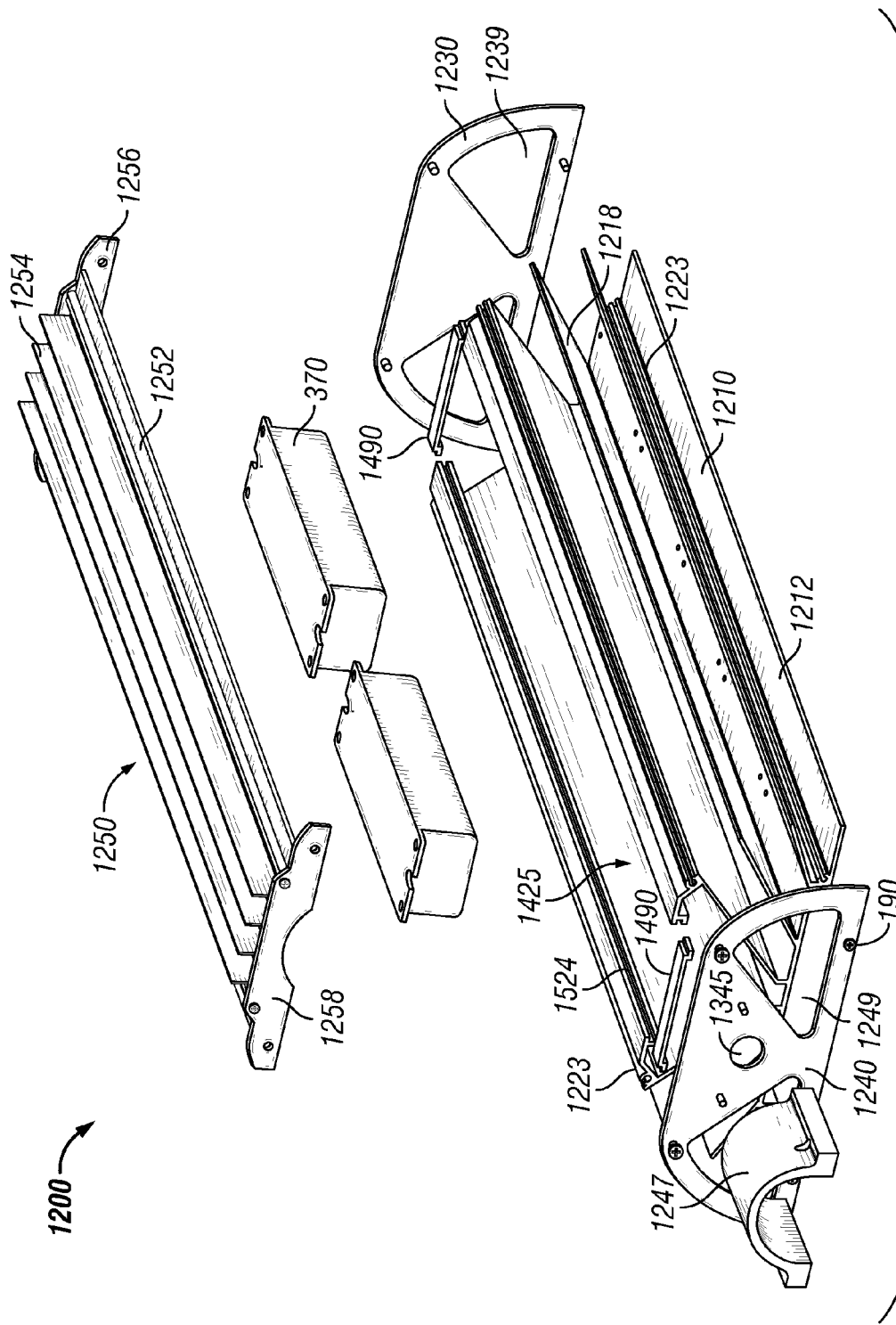
FIG. 15 shows an exploded view of the LED lighting fixture of FIG. 12 in accordance with the fifth exemplary embodiment of the present invention.

FIGS. 12 and 13 show perspective views of an LED lighting fixture 1200 in accordance with a fifth exemplary embodiment of the present invention. FIG. 14 shows another perspective view of the LED lighting fixture 1200 with a door 1250 positioned in an open position in accordance with the fifth exemplary embodiment of the present invention. FIG. 15 shows an exploded view of the LED lighting fixture 1200 in accordance with the fifth exemplary embodiment of the present invention. Referring to FIGS. 12-15, the LED lighting fixture 1200 includes a heat sink chassis 1210, a front panel 1230, a rear panel 1240, a door 1250, one or more drivers 370, and one or more LED modules (not shown), which are similar to LED modules 180 (FIG. 1). Optionally, the LED lighting fixture 1200 includes one or more mounting hardwares 190, such as screws and/or rivets, for permanently or temporarily coupling one or more of the previously mentioned components to at least one other previously mentioned component. Additionally, although not shown, the LED lighting fixture 1200 also includes one or more electrical wires (not shown) electrically coupling each driver 370 to one or more LED modules.

Figure 16:
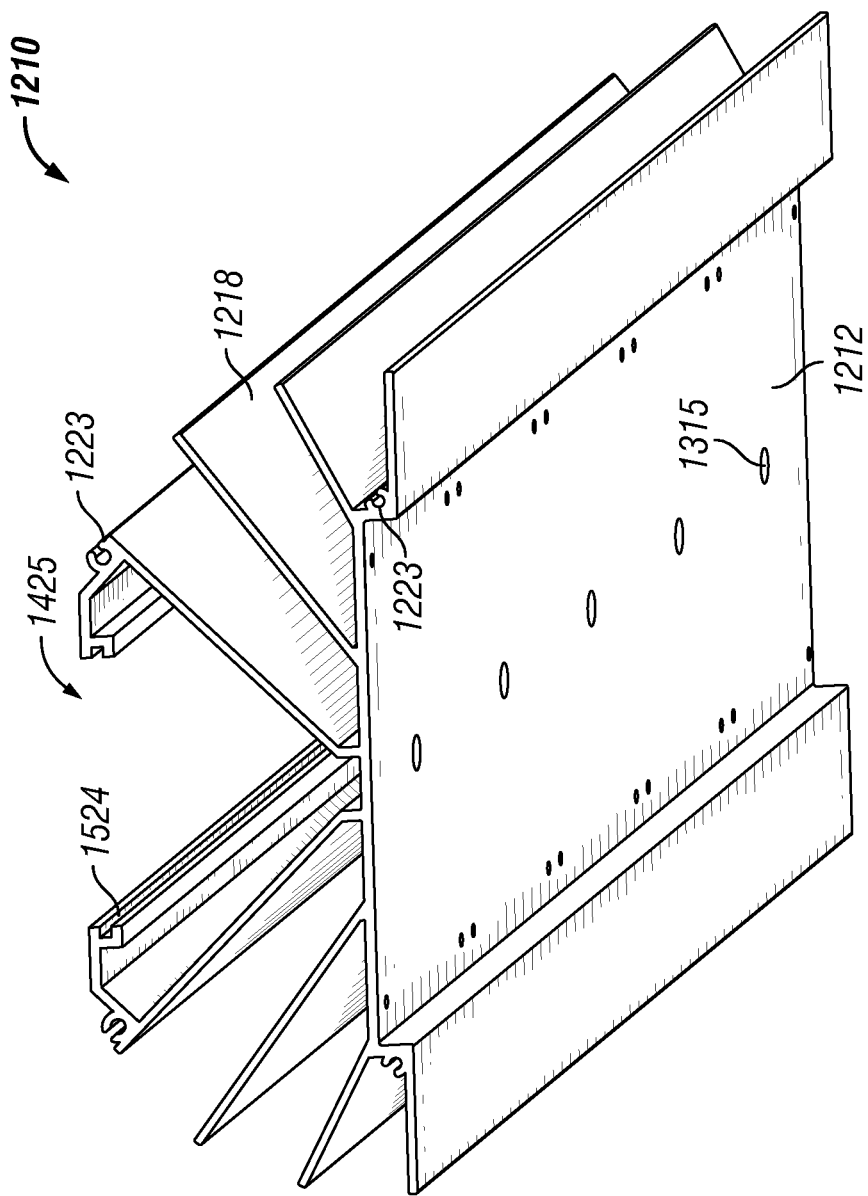
FIG. 16 shows a perspective view of a heat sink chassis of FIG. 12 in accordance with the fifth exemplary embodiment of the present invention.

FIG. 16 shows a perspective view of the heat sink chassis 1210 in accordance with the fifth exemplary embodiment of the present invention. Referring to FIGS. 12-16, the heat sink chassis 1210 includes a platform 1212, one or more fins 1218, and a manifold chamber 1425. The platform 1212 is substantially planar and includes one or more openings 1315 extending through the platform 1212. However, the platform 1212 is non-planar in other exemplary embodiments. These openings 1315 provide a pathway for the electrical wires to electrically couple the driver 370 to the one or more LED modules. The platform 1212 is fabricated from aluminum and is extruded in certain exemplary embodiments; however, the platform 1212 is fabricated using other suitable materials and/or using other suitable manufacturing processes that are known to persons having ordinary skill in the art and having the benefit of the present disclosure.

The heat sink chassis 1210 includes one or more fins 1218 that extend outwardly away from the platform 1212 in an angular manner. In certain exemplary embodiments, one or more corresponding fins 1218 form a substantially "V-shaped" orientation. The fins 1218 facilitate removing the heat generated from at least the LED modules to the surrounding environment. According to some exemplary embodiments, two adjacent corresponding fins 1218 that are positioned the closest to the longitudinal central axis of the platform 1212 include a screw track 1223 and a lip 1524 that extend along the length of each of those corresponding fins 1218. Additional screw tracks 1223 are formed along the surface of the platform 1212 and extend the longitudinal length of the platform 1212. Additionally, these two adjacent corresponding fins 1218 that are positioned the closest to the longitudinal central axis of the platform 1212 form a portion of the manifold chamber 1425. The manifold chamber 1425 is accessible through the openings 1315 and provides a pathway for electrical wires to proceed from the drivers 370, through the openings 1315, and to the one or more LED modules which are coupled onto a surface of the platform 1212. The fins 1218 are fabricated from aluminum and are extruded in certain exemplary embodiments; however, the fins 1218 are fabricated using other suitable materials and/or using other suitable manufacturing processes that are known to persons having ordinary skill in the art and having the benefit of the present disclosure. The fins 1218 are fabricated with the platform 1212 as a single component, but can be fabricated separately in other exemplary embodiments. Also, each of the screw tracks 1223 and each of the lips 1524 also are formed using an extrusion process according to certain exemplary embodiments.

Figure 17:
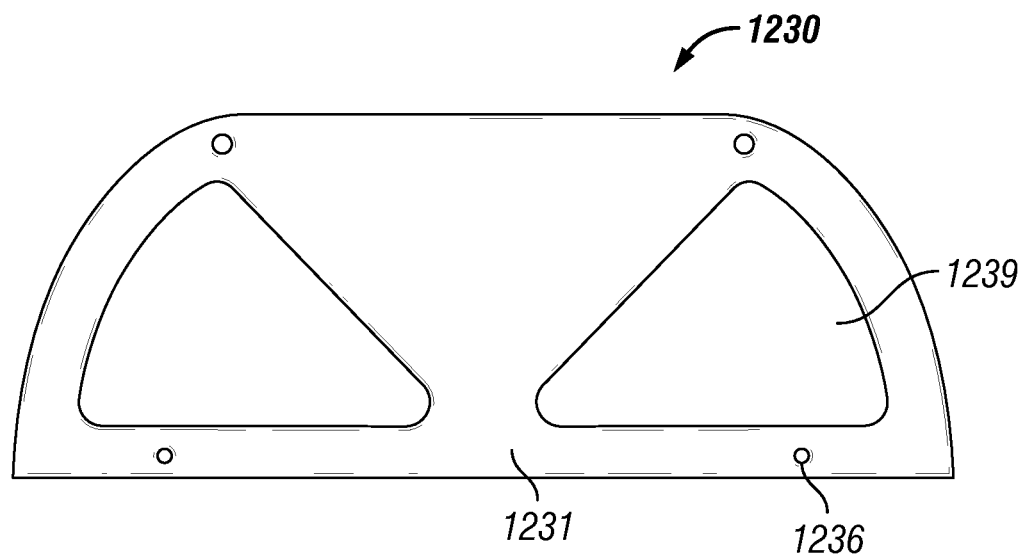
FIG. 17 shows a side view of a front panel of FIG. 12 in accordance with the fifth exemplary embodiment of the present invention.

FIG. 17 shows a side view of the front panel 1230 in accordance with the fifth exemplary embodiment of the present invention. Referring to FIGS. 12-15 and 17, the front panel 1230 includes a base portion 1231. The edge of the base portion 1231 is shaped substantially according to the shape defined by the upper portions of the side edges of the fins 1218 and the side edge of the platform 1212. The base portion 1231 also includes one or more openings 1236 formed therethrough, which each align with a respective screw track 1223. Each of these openings 1236 are configured to receive mounting hardware 190 that facilitate permanently coupling and/or temporarily holding the front panel 1230 adjacent to the heat sink chassis 1210. Once the front panel 1230 is positioned adjacent to the heat sink chassis 1210, a portion of the front panel 1230 forms a portion of the manifold chamber 1425. According to certain exemplary embodiments, the front panel 1230 includes one or more apertures 1229 formed therein. According to certain exemplary embodiments, the front panel 1230 is fabricated from aluminum and is extruded as a single component. However, in other exemplary embodiments, the front panel 1230 is fabricated using other suitable materials and/or is formed using other processes known to persons having ordinary skill in the art and having the benefit of the present disclosure. Additionally, in other exemplary embodiments, the front panel 1230 is formed from multiple components that are assembled together thereafter.

Figure 18:
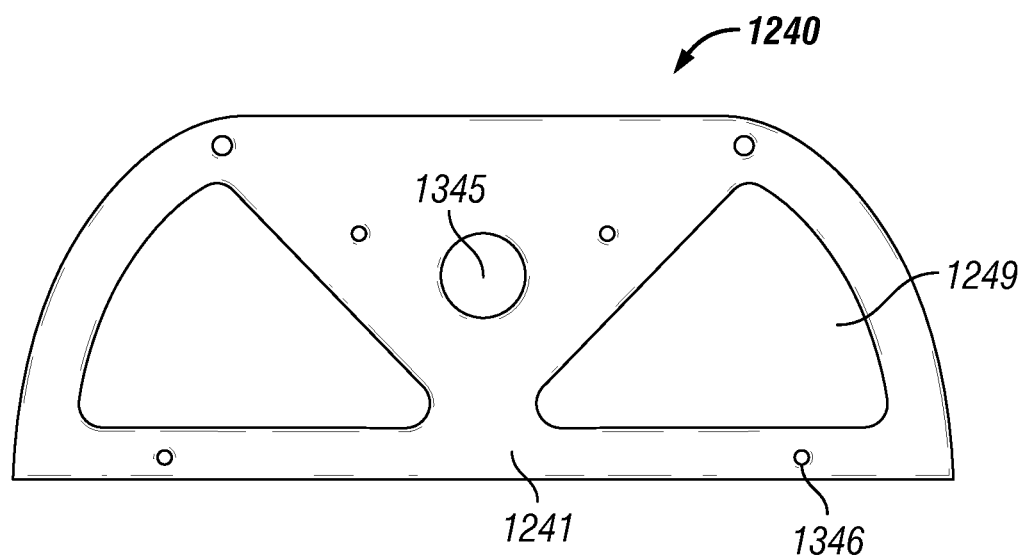
FIG. 18 shows a side view of a rear panel's base portion of FIG. 13 in accordance with the fifth exemplary embodiment of the present invention.
Figure 19:
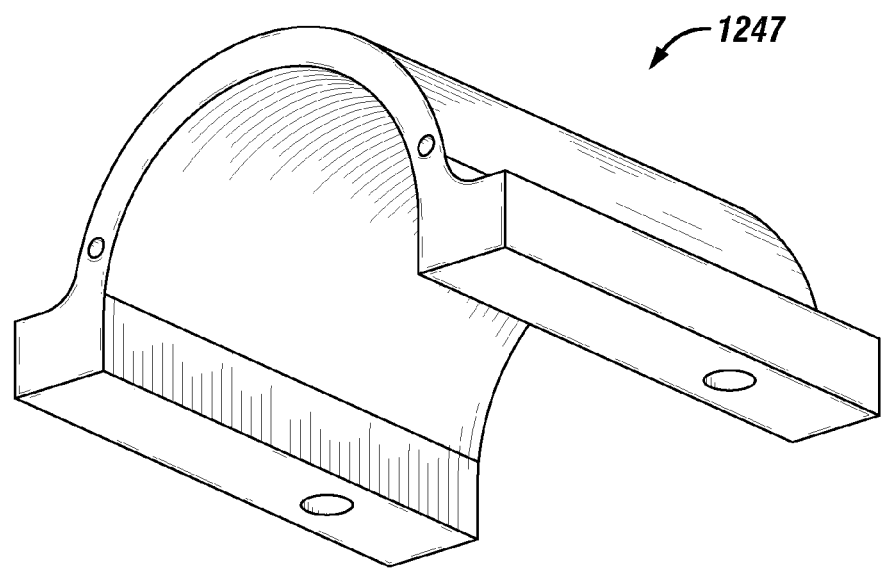
FIG. 19 shows a perspective view of a rear panel's fitter of FIG. 13 in accordance with the fifth exemplary embodiment of the present invention.

FIG. 18 shows a side view of a rear panel's base portion 1241 in accordance with the fifth exemplary embodiment of the present invention. FIG. 19 shows a perspective view of a rear panel's fitter 1247 in accordance with the fifth exemplary embodiment of the present invention. Referring to FIGS. 12-15 and 18-19, the rear panel 1240 includes the base portion 1241 and the fitter 1247 extending outwardly from the base portion 1241. The base portion 1241 is shaped similarly to the base portion 1231 and is shaped substantially according to the shape defined by the upper portions of the side edges of the fins 1218 and the side edge of the platform 1212. The base portion 1241 also includes an aperture 1345 that extends through the base portion 1241 and allows for electrical wires to pass through from an exterior power source (not shown) to the drivers 370 positioned within the manifold chamber 1425. The base portion 1241 also includes one or more openings 1346 formed therethrough which each align with a respective screw track 1223. Each of these openings 1346 are configured to receive a mounting hardware 190 that facilitates permanently coupling and/or temporarily holding the rear panel 1240 adjacent to the heat sink chassis 1210. Once the rear panel 1240 is positioned adjacent to the heat sink chassis 1210, a portion of the rear panel 1240 forms a portion of the manifold chamber 1425. According to certain exemplary embodiments, the rear panel 1240 includes one or more apertures 1249 formed therein. The fitter 1247 extends orthogonally away from the base portion 1241 and couples to a mounting structure (not shown), such as a pole. The fitter 1247 is semi-circular in shape and is positioned partially surrounding the aperture 1345. However, the fitter 1247 can be shaped differently in other exemplary embodiments. According to certain exemplary embodiments, the rear panel's base portion 1241 and the fitter 1247 are fabricated from aluminum and are extruded as individual components which are thereafter coupled to one another. However, in other exemplary embodiments, the rear panel's base portion 1241 and/or the fitter 1247 are fabricated using other suitable materials and/or is formed using other processes known to persons having ordinary skill in the art and having the benefit of the present disclosure. Additionally, in other exemplary embodiments, the rear panel's base portion 1241 and the fitter 1247 are integrally formed as a single component.

Figure 20:
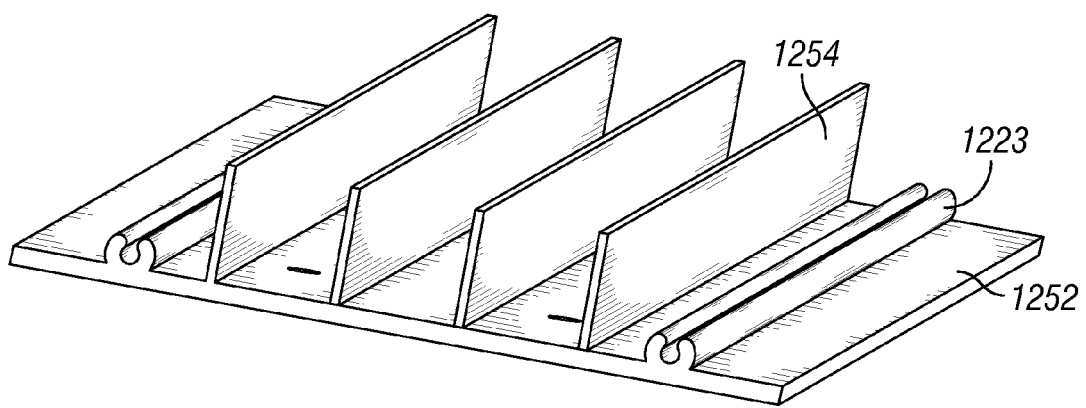
FIG. 20 shows a perspective view of a door's base with one or more fins extending outwardly therefrom of FIG. 12 in accordance with the fifth exemplary embodiment of the present invention.
Figure 21:
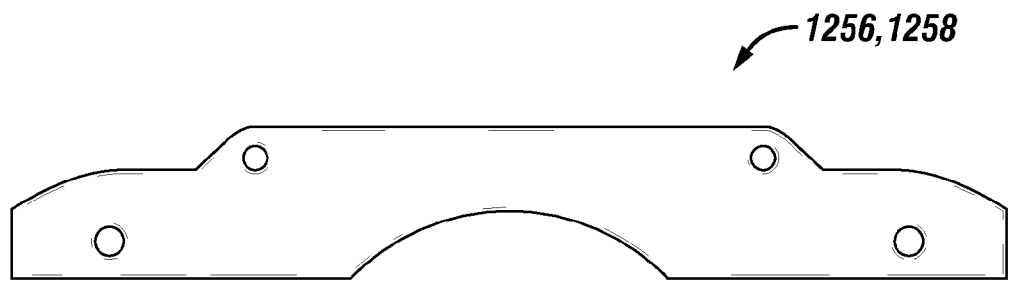
FIG. 21 shows a side view of a door's door cap of FIG. 12 in accordance with the fifth exemplary embodiment of the present invention.

FIG. 20 shows a perspective view of a door's base 1252 with one or more fins 1254 extending outwardly therefrom in accordance with the fifth exemplary embodiment of the present invention. FIG. 21 shows a side view of a door's door cap 1256, 1258 in accordance with the fifth exemplary embodiment of the present invention. Referring to FIGS. 12-15 and 20-21, the door 1250 includes the base 1252, one or more fins 1254, a first door cap 1256, and a second door cap 1258. The base 1252 is substantially planar and includes one or more screw tracks 1223 extending the length of the base 1252. Each of these screw tracks 1223 are configured to receive a mounting hardware 190 that facilitates permanently coupling and/or temporarily holding the door caps 1256, 1258 to the base 1252. The fins 1254 extend the length of the base 1252 and extend substantially perpendicularly from the base 1252. However, in certain exemplary embodiments, the fins 1254 extend outwardly from the base 1252 at an angle. The first door cap 1256 is coupled to one end of the base 1252 using mounting hardware 190. Similarly, the second door cap 1258 is coupled to an opposing end of the base 1252 also using mounting hardware 190. According to certain exemplary embodiments, the door's base 1252 and the fins 1254 are fabricated from aluminum and are extruded as a single component. However, in other exemplary embodiments, the door's base 1252 and/or the fins 1254 are fabricated using other suitable materials and/or are formed using other processes known to persons having ordinary skill in the art and having the benefit of the present disclosure. Additionally, in other exemplary embodiments, the door's base 1252 and the fins 1254 are formed from multiple components that are assembled together thereafter. Also, each of the door caps 1256, 1258 is fabricated from aluminum or other suitable material and is extruded as individual components. Alternatively, one or more of the door caps 1256, 1258 are formed using other processes known to persons having ordinary skill in the art and having the benefit of the present disclosure.

Figure 22:
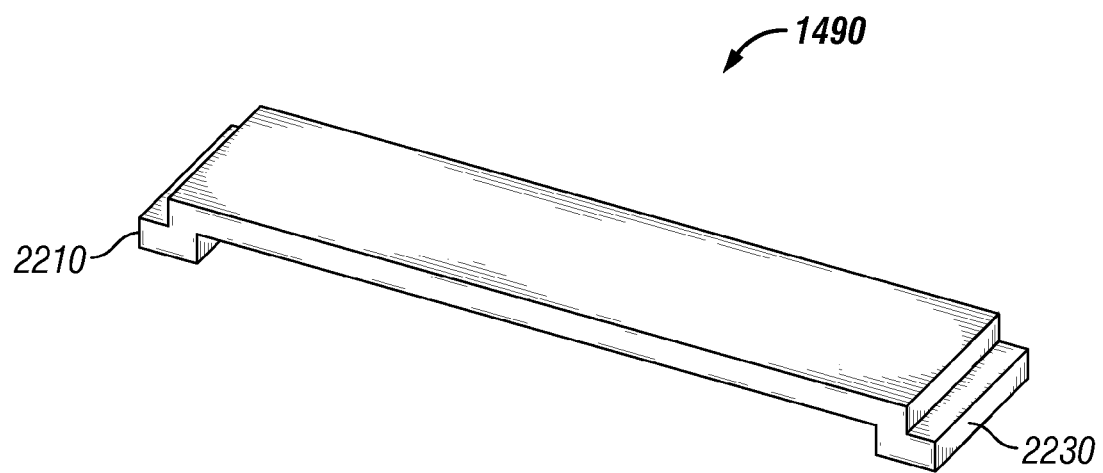
FIG. 22 shows a perspective view of a flange insert of FIG. 14 in accordance with the fifth exemplary embodiment of the present invention.

FIG. 22 shows a perspective view of the flange insert 1490 in accordance with the fifth exemplary embodiment of the present invention. The flange insert 1490 is optional and provides additional surface area when coupling the front panel 1230 or the rear panel 1240 to the heat sink chassis 1210. Referring to FIGS. 12-15 and 22, the flange insert 1490 includes a first end 2210 and a second end 2230. Each end 2210, 2230 of the flange insert 1490 is inserted into a respective lip 1524. The flange insert 1490 is positioned at each end of the heat sink chassis 1210.

The driver 370 is electrically coupled with one or more LED modules using one or more electrical wires that pass through the manifold chamber 1425 and is also electrically coupled to the electrical wires routed into the manifold chamber 1425 from the aperture 1345. The driver 370 provides power to the one or more LED modules and also controls the intensity and/or color of one or more LEDs (not shown) within the LED modules. For example, the driver 370 is capable of dimming the LEDs if desired. The driver 370 produces heat which is removed from within the manifold chamber 1425 to an external area outside of the LED light fixture 1200 via the fins 1254.

According to certain exemplary embodiments, each LED module include one or more LED die packages (not shown), or LEDs, coupled to a substrate (not shown). According to some exemplary embodiments the LED die packages, or LEDs, are aligned in a four by four array; however, the LED die packages, or LEDs, are aligned in a different array in other exemplary embodiments. The substrate is mounted to a surface of the platform 1212 over one of the openings 1315 and is oriented so that the LED die packages, or LEDs, are emitting light towards a desired illumination area. The substrate includes one or more sheets of ceramic, metal, laminate, circuit board, Mylar®, or another material. Each LED die package, or LED, includes a chip of semi-conductive material that is treated to create a positive-negative ("p-n") junction. When the LED die packages, or LEDs, are electrically coupled to a power source, such as the driver 370, current flows from the positive side to the negative side of each junction, causing charge carriers to release energy in the form of incoherent light.

The wavelength or color of the emitted light depends on the materials used to make the LED die packages, or LEDs. For example, a blue or ultraviolet LED typically includes gallium nitride ("GaN") or indium gallium nitride ("InGaN"), a red LED typically includes aluminum gallium arsenide ("AlGaAs"), and a green LED typically includes aluminum gallium phosphide ("AlGaP"). Each of the LEDs in the LED die package can produce the same or a distinct color of light. For example, in certain exemplary embodiments, the LED die package includes one or more white LEDs and one or more non-white LEDs, such as red, yellow, amber, or blue LEDs, for adjusting the color temperature output of the light emitted from the fixture 1200. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain exemplary embodiments, the emitted light includes substantially white light that seems slightly blue, green, red, yellow, orange, or some other color or tint. In certain exemplary embodiments, the light emitted from the LED die packages, or LEDs, has a color temperature between 2500 and 5000 degrees Kelvin.

In certain exemplary embodiments, an optically transmissive or clear material (not shown) encapsulates at least a portion of each LED die package, or LED. This encapsulating material provides environmental protection while transmitting light from the LED die package, or LED. In certain exemplary embodiments, the encapsulating material includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating white light. In certain exemplary embodiments, the white light has a color temperature between 2500 and 5000 degrees Kelvin.

In certain exemplary embodiments, the LED die packages, or LEDs, include one or more arrays of LED die packages, or LEDs, that are collectively configured to produce a lumen output from 1 lumen to 5000 lumens. The LED die packages, or LEDs, are attached to the substrate by one or more solder joints, plugs, epoxy or bonding lines, and/or other means for mounting an electrical/optical device on a surface. The substrate is electrically connected to support circuitry (not shown) and/or the driver 370 for supplying electrical power and control to the LED die packages, or LEDs. For example, one or more wires couple opposite ends of the substrate to the driver 370, thereby completing a circuit between the driver 370, the substrate, and the LED die packages, or LEDs.

Figure 23:
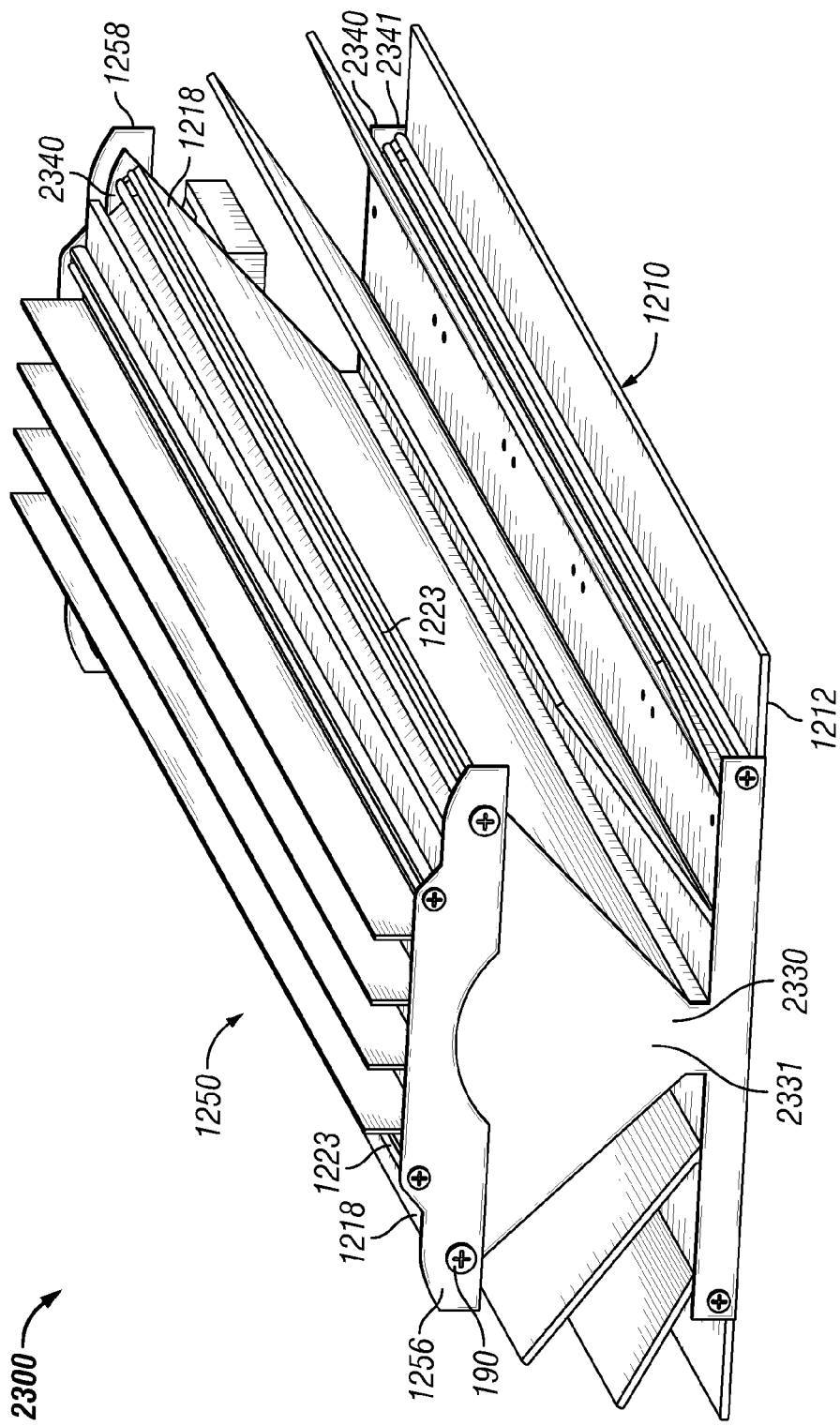
FIG. 23 shows a perspective view of an LED lighting fixture in accordance with a sixth exemplary embodiment of the present invention.
Figure 24:
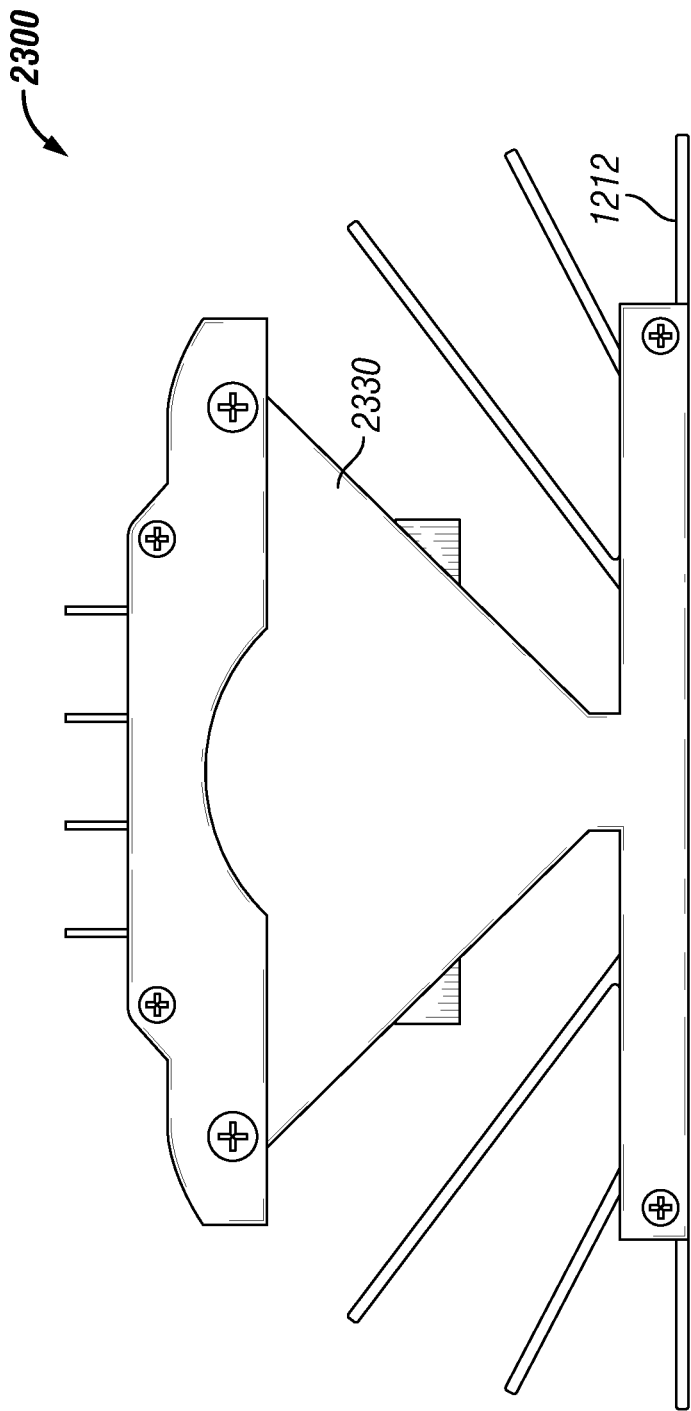
FIG. 24 shows a front view of the LED lighting fixture of FIG. 23 in accordance with the sixth exemplary embodiment of the present invention.

FIG. 23 shows a perspective view of an LED lighting fixture 2300 in accordance with a sixth exemplary embodiment of the present invention. FIG. 24 shows a front view of the LED lighting fixture 2300 in accordance with the sixth exemplary embodiment of the present invention. Referring to FIGS. 23-24, the LED lighting fixture 2300 is similar to the LED lighting fixture 1200 (FIG. 12) except the shape of the front panel 2330 and the rear panel 2340 of the LED lighting fixture 2300 is different than the shape of the front panel 1230 (FIG. 12) and the rear panel 1240 (FIG. 12) of the LED lighting fixture 1200 (FIG. 12). Specifically, the shape of the base portions 2331, 2341 of each of the front panel 2330 and the rear panel 2340, respectively, is shaped substantially according to the shape defined by the side edges of the two adjacent corresponding fins 1218 that bound the manifold chamber 1425 (FIG. 14) and the side edge of the platform 1212. The assembly of the LED light fixture 2300 is similar to the assembly of the LED light fixture 1200 (FIG. 12), which is described in further detail below.

The method of assembling a light fixture housing includes brazing at least two components, or portions, of a light fixture housing or heat sink together. Generally, a first portion of a light fixture housing, or heat sink, and a second portion of a light fixture housing, or heat sink, is positioned adjacently next to one another. The first portion is fastened to the second portion using at least one coupling device. One or more gaps are formed between the first portion and the second portion. A brazing material is applied between the first and second portions. The fastened first and second portions and the brazing material is pre-heated to a first temperature. The fastened first and second portions and the brazing material is further heated, such as within a molten salt bath, thereby causing the brazing material to flow into the gaps. The fastened first and second portions are cooled to form a metallurgical bond therebetween. Although a general description for assembling at least a portion of a light fixture housing or heat sink has been provided, a more detailed discussion with respect to forming a light fixture housing or heat sink using the dip brazing process, according to one exemplary embodiment, is provided below. This detailed discussion will provide the necessary teachings to make this dip brazing process useful for joining and/or assembling other shapes and forms of heat sinks and light fixture housings.

FIGS. 25A-25J illustrate a method for assembling the LED lighting fixture 2300 (FIG. 23) in accordance with an exemplary embodiment of the present invention. LED lighting fixture 1200 (FIG. 12) also is assembled in a similar manner as the assembly of LED lighting fixture 2300 (FIG. 23). Further, any of the above exemplary embodiments can be formed using the dip brazing process described below. The LED lighting fixture 2300 is assembled according to various steps and methods. Although certain steps are described according to some exemplary embodiments, the order of the steps and/or methods is varied in other exemplary embodiments. Although the method described below involves a dip brazing process, other brazing processes which include, but are not limited to, torch brazing, furnace brazing, vacuum brazing, braze welding, silver brazing, and cast iron welding, are used in other exemplary embodiments. One advantage of using dip brazing processes is the ability to join thin and thick sections in one or multiple areas of a part. Additionally, dip brazing processes allow for the joining of components to fabricate complex forms. Another advantage is that dip brazing processes form leak-proof joints. Additional advantages of the dip brazing process include forming joints having strong metallurgical bonds, forming joints that are unaltered by typical changes in temperature, forming joints that minimize thermal distortion, forming joints that resist vibration or shock, forming joints that eliminate corrosion, and forming joints that have a clean, refined appearance. Further advantages of the dip brazing process include joining components of different sizes/thicknesses of materials which cannot be performed as well using welding processes or other forms of joining processes and joining components having different materials. Such advantages associated with brazing may translate to a reduction in weight and/or reduction in material costs associated with an LED light fixture assembled in part using the brazing process, or allow portions of the fixture to be better water (or weather) resistant (or waterproof), or even improve the thermal management performance of such a fixture allow for better material/component interfaces and a wider variety of shapes.

Figures 1, 25A:
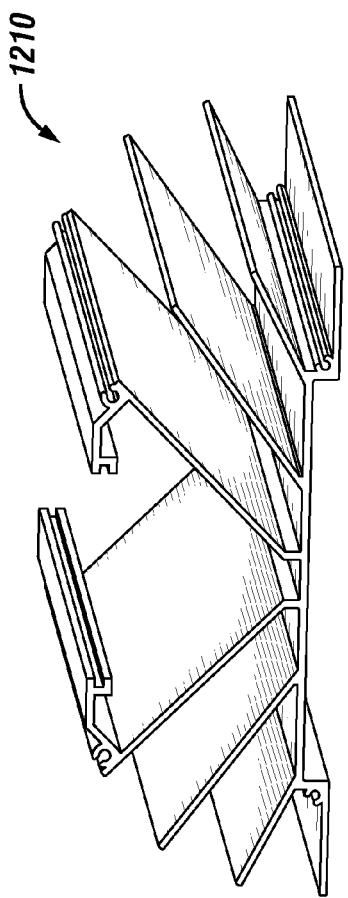
FIGS. 25A-25J illustrate a method for assembling the LED lighting fixture of FIG. 23 in accordance with an exemplary embodiment of the present invention.
Figures 2, 25A:
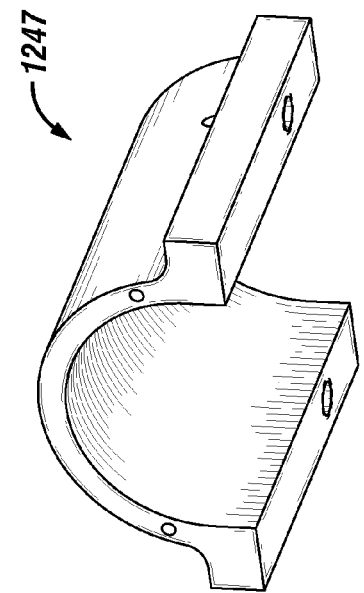
Figures 3, 25A:
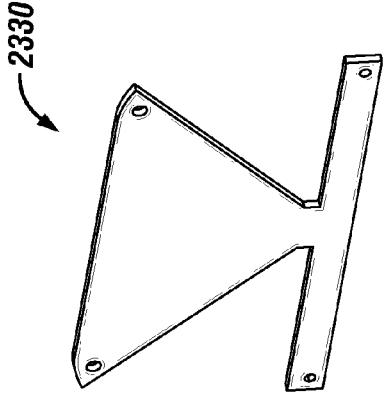
Figures 4, 25A:
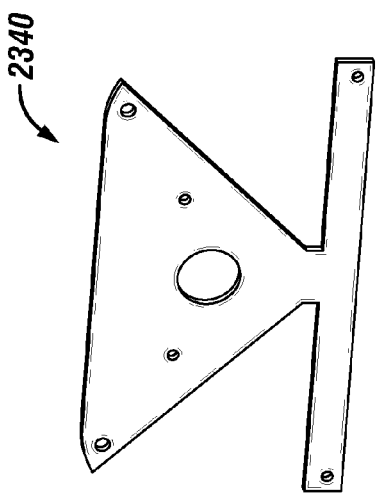
Figures 5, 25A:
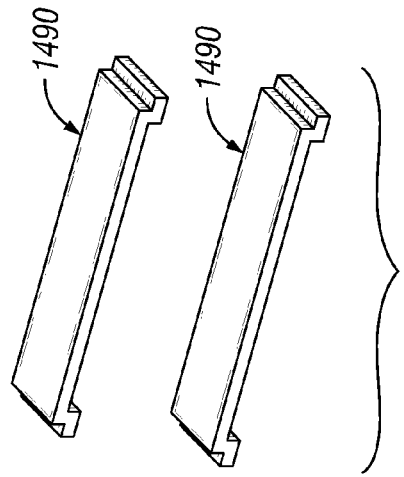

Referring to FIG. 25A, several components of the LED lighting fixture 2300 are obtained. Specifically, the heat sink chassis 1210, the front panel 2330, the rear panel 2340, the fitter 1247, and two flange inserts 1490 are obtained. In certain exemplary embodiments, the heat sink chassis 1210, the fitter 1247, and two flange inserts 1490 are fabricated using aluminum and are manufactured via an extrusion process which is known to persons having ordinary skill in the art with the benefit of the present disclosure. The front panel 2330 and the rear panel 2340 also are fabricated using aluminum but are formed via a stamping process which is known to persons having ordinary skill in the art with the benefit of the present disclosure. However, in other exemplary embodiments, one or more components are fabricated using other suitable materials and/or other manufacturing processes.

Figure 25B:
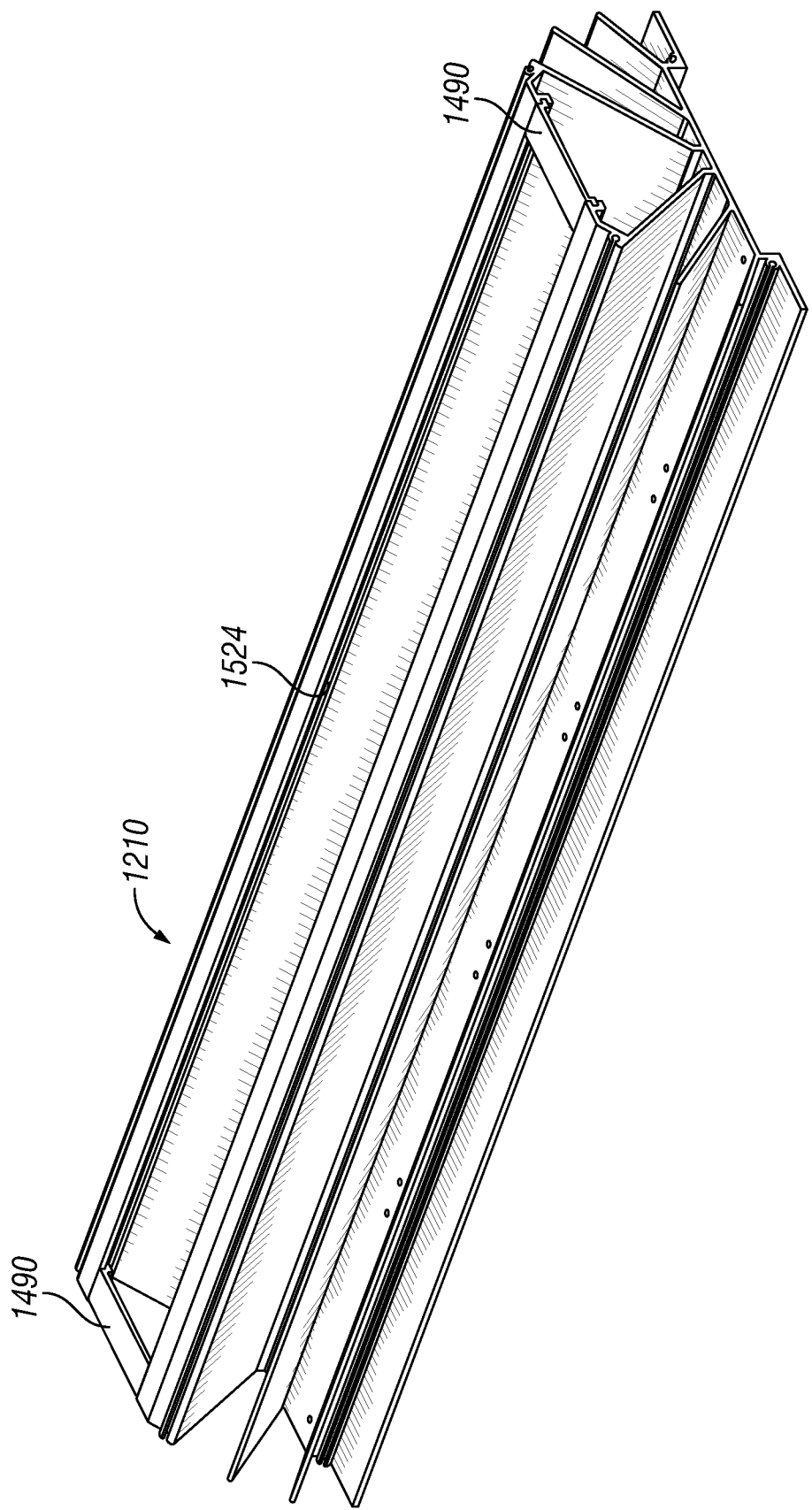

Referring to FIG. 25B, each of the flange inserts 1490 is inserted into the lip 1524 and slidably moved to each end of the heat sink chassis 1210. In certain exemplary embodiments, a brazing material (not shown) is placed along at least portions of the edges of the flange inserts 1490 and the heat sink chassis 1210 that are to be in contact with each of the front panel 2330 and the rear panel 2340. Alternatively, or additionally, the brazing material is placed along at least portions of the front panel 2330 and/or the rear panel 2340 that are to be in contact with portions of the heat sink chassis 1210. The brazing material is aluminum clad material, a flux material, or other suitable material known to persons having ordinary skill in the art with the benefit of the present disclosure. In certain exemplary embodiments, the brazing material is in a paste or shim form. In certain exemplary embodiments, the brazing material has about ninety percent aluminum. In other exemplary embodiments, the brazing material is placed adjacent to these points of contact after the front panel 2330 and/or the rear panel 2340 are fastened to the heat sink chassis 1210, but before the fastened components are placed within a furnace.

Figure 25C:
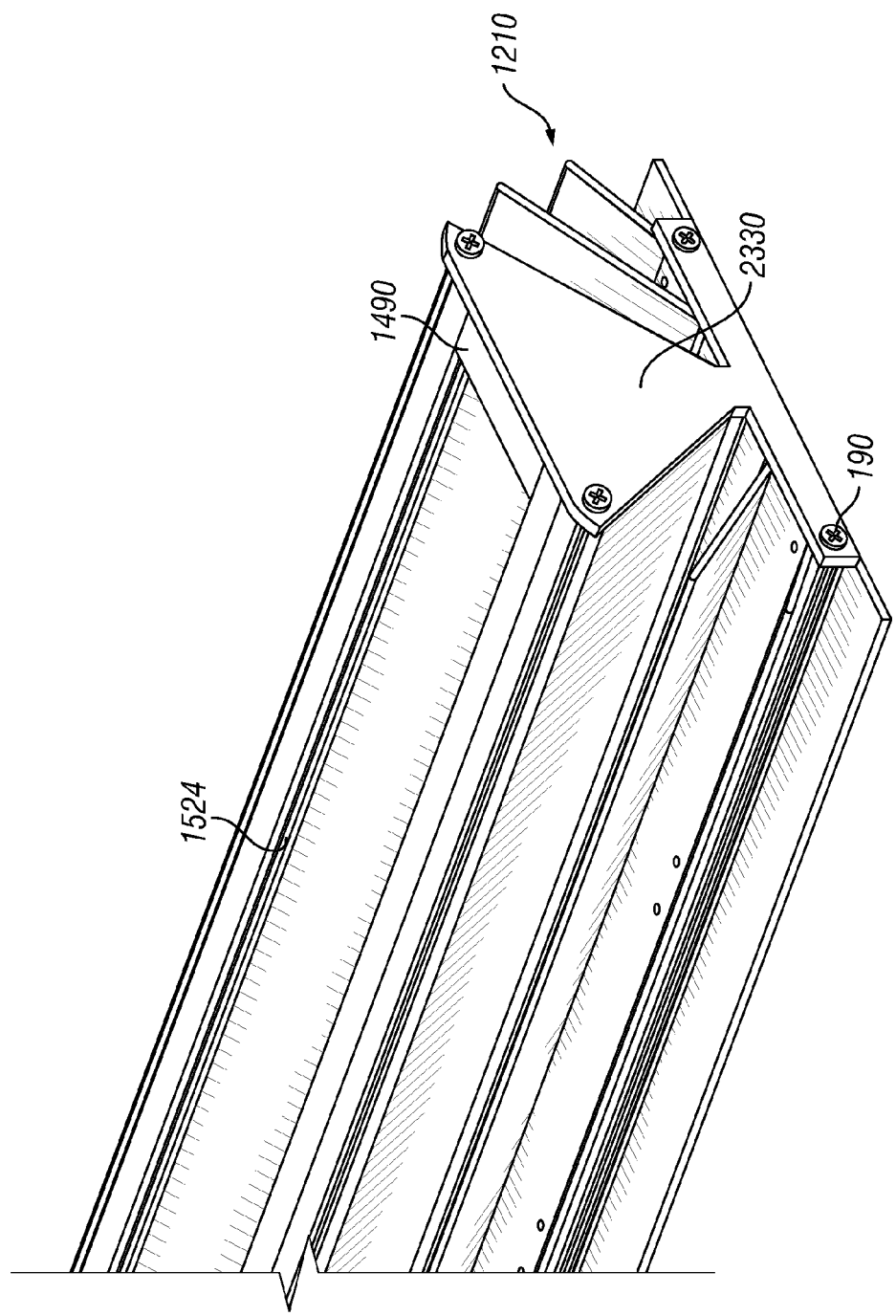

Referring to FIG. 25C, the front panel 2330 is fastened to the end of the heat sink chassis 1210 using mounting hardware 190. In some exemplary embodiments, four coupling devices 190, such as screws, are used to fasten the front panel 2330 to the end of the heat sink chassis 1210. Once the front panel 2330 is fastened to the heat sink chassis 1210, the corresponding flange insert 1490 is slidably moved within the lip 1524 so that an edge of the flange insert 1490 is in contact with a portion of the front panel 2330. According to certain exemplary embodiments, a substantially consistent gap is provided between the different components to be brazed together, which allows the brazing material to flow sufficiently.

Figure 25D:
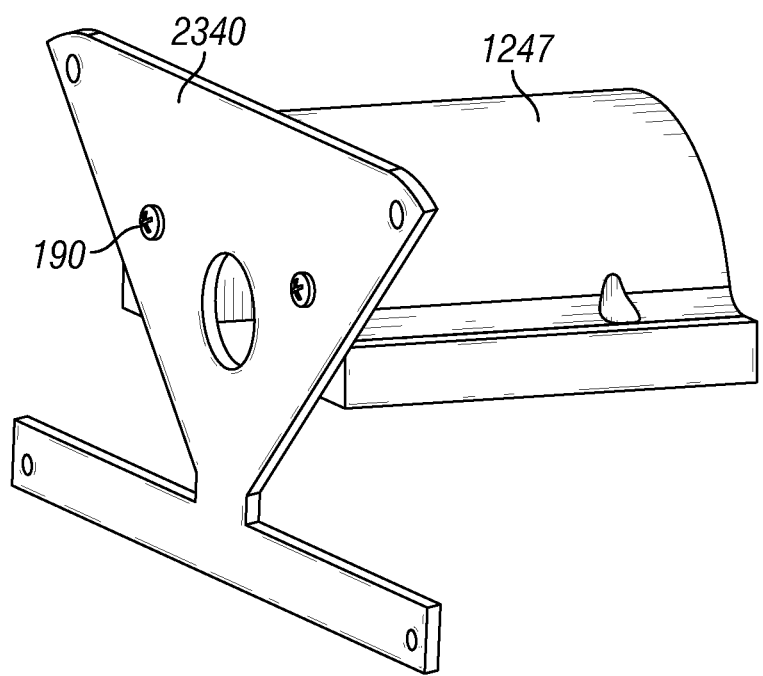

Referring to FIG. 25D, the fitter 1247 is fastened to the rear panel 2340 using mounting hardware 190. In some exemplary embodiments, two coupling devices 190 are used to fasten the fitter 1247 to the rear panel 2340. According to some exemplary embodiments, brazing material is placed along at least portions of the edges of the fitter 1247 that are to be in contact with the rear panel 2340. Alternatively, or additionally, the brazing material is placed along at least portions of the rear panel 2340 that are to be in contact with an edge of the fitter 1247. This brazing material is placed before the fitter 1247 is fastened to the rear panel 2340. According to other exemplary embodiments, the brazing material is placed adjacent to these points of contact after the fitter 1247 is fastened to the rear panel 2340, but before these fastened components are placed within the furnace. According to certain exemplary embodiments, a substantially consistent gap is provided between the different components to be brazed together, which allows the brazing material to flow sufficiently.

Figure 25E:
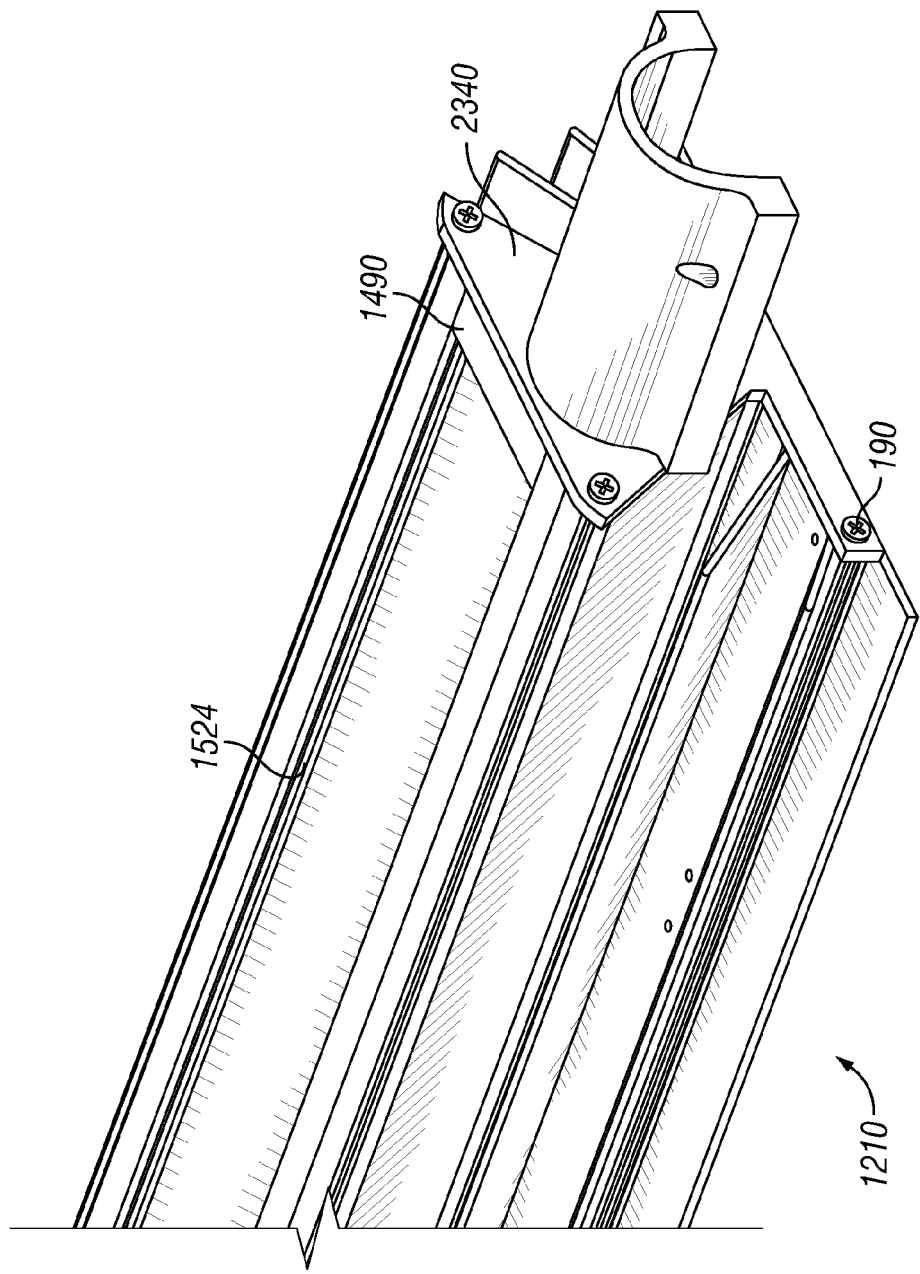

Referring to FIG. 25E, the rear panel 2340 is fastened to the opposing end of the heat sink chassis 1210 using coupling device 190. In some exemplary embodiments, four coupling devices 190 are used to fasten the rear panel 2340 to the end of the heat sink chassis 1210. Once the rear panel 2340 is fastened to the heat sink chassis 1210, the corresponding flange insert 1490 is slidably moved within the lip 1524 so that an edge of the flange insert 1490 is in contact with a portion of the rear panel 2340. According to certain exemplary embodiments, a substantially consistent gap is provided between the different components to be brazed together, which allows the brazing material to flow sufficiently.

Figure 25F:
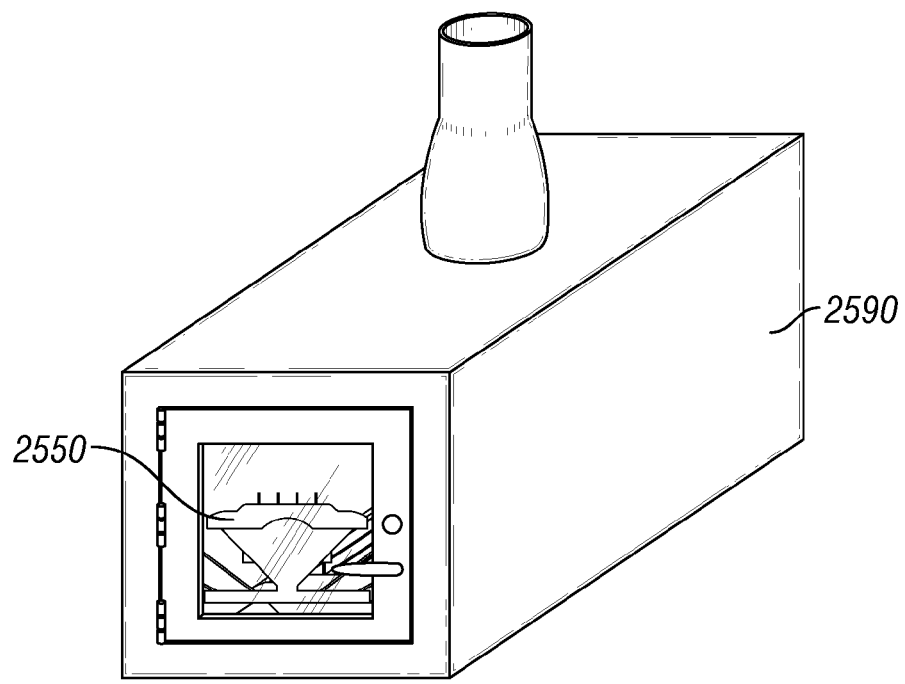

Referring to FIG. 25F, the fastened components, which include the heat sink chassis 1210 (FIG. 25A), the front panel 2330 (FIG. 25A), the rear panel 2340 (FIG. 25A), the fitter 1247 (FIG. 25A), and the flange inserts 1490 (FIG. 25A) (collectively labeled as 2550), are inserted into a furnace 2590. The furnace 2590 pre-heats these fastened components 2550 to about 900° F. or higher. The furnace 2590 is open to the atmosphere in certain exemplary embodiments, but is enclosed in other exemplary embodiments so that the pressure and/or the surrounding gases are different that atmospheric pressure and air.

Figure 25G:
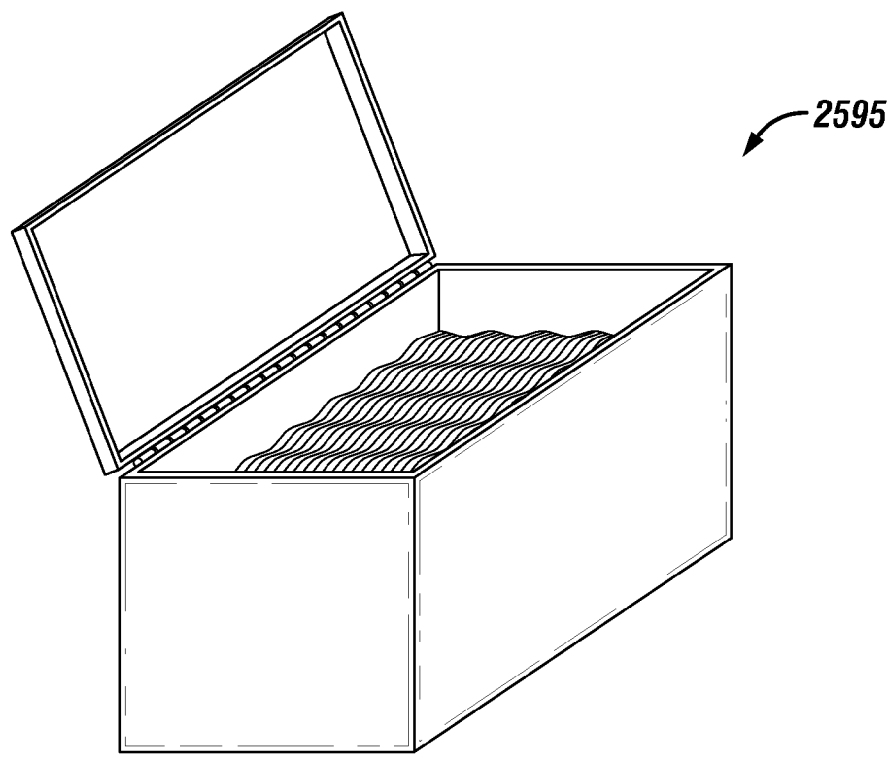

Referring to FIG. 25G, the fastened components 2550 mentioned above are removed from the furnace 2590 (FIG. 25F) and dipped or immersed into a molten salt bath 2595 where the brazing material flows via capillary action into the gaps between the components brazing them together. The temperature rises above the melting temperature of the brazing material but remains below the melting temperature of the components to be brazed together.

Figure 25H:
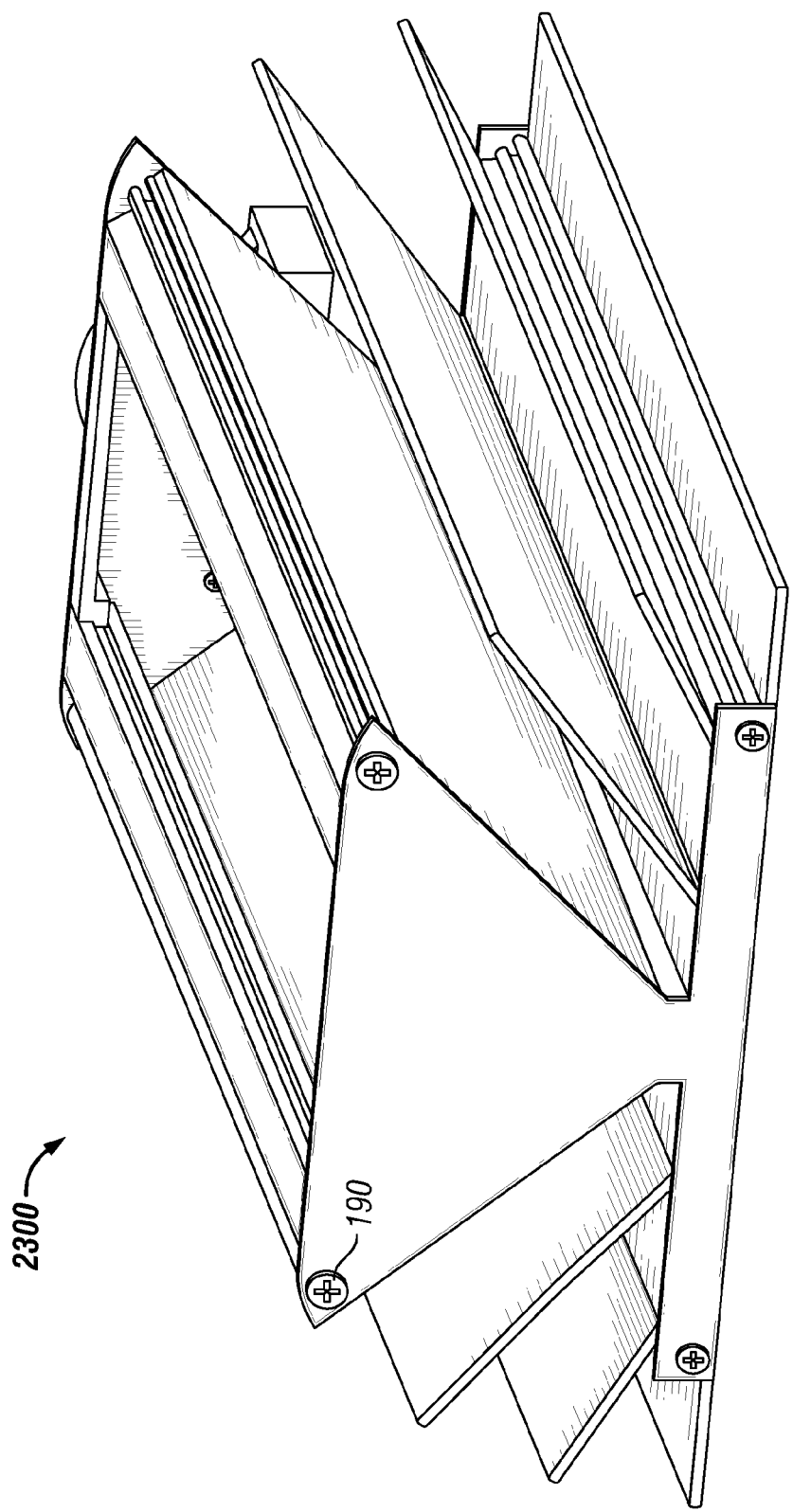
Figures 1, 25I:
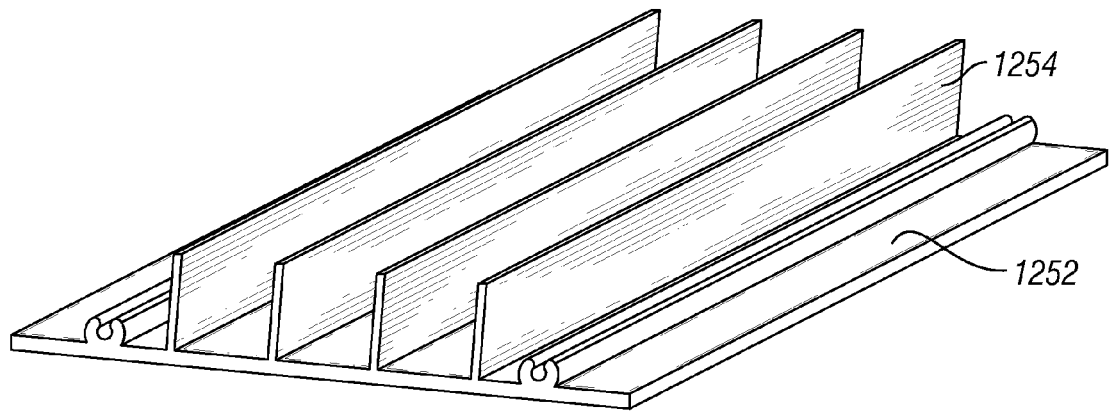
Figures 2, 25I:
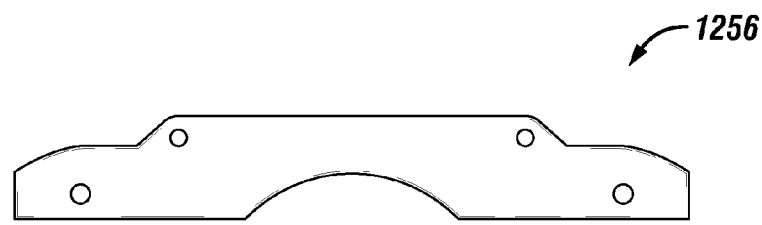
Figures 3, 25I:
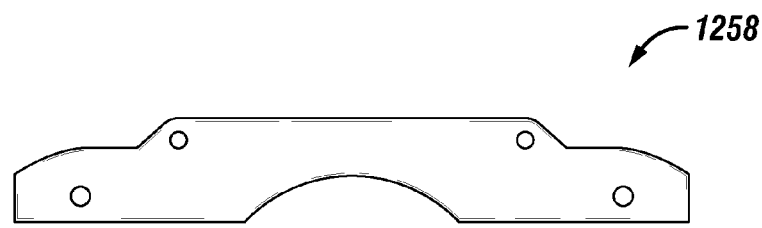

Referring to FIG. 25H, the fastened components 2550 are removed from the molten salt bath 2595 (FIG. 25G) and are allowed to cool. The fastened components 2550 are now coupled to one another via the brazing material. The top two coupling devices 190 on either side and on both ends of the LED lighting fixture 2300, without the door 1250, are removed. The LED lighting fixture 2300, without the door 1250, is now assembled and is ready for finishing or painting according to certain exemplary embodiments.

Referring to FIG. 14I, several components of the door 1250 of the LED lighting fixture 2300 is obtained. Specifically, the door's base 1252 having one or more fins 1254 and the door's door caps 1256, 1258 are obtained. In certain exemplary embodiments, the door's base 1252 having one or more fins 1254 is fabricated using aluminum and is manufactured via an extrusion process which is known to persons having ordinary skill in the art with the benefit of the present disclosure. The door's door caps 1256, 1258 also are fabricated using aluminum but are formed via a stamping process which is known to persons having ordinary skill in the art with the benefit of the present disclosure. However, in other exemplary embodiments, one or more components are fabricated using other suitable materials and/or other manufacturing processes.

Figure 25J:
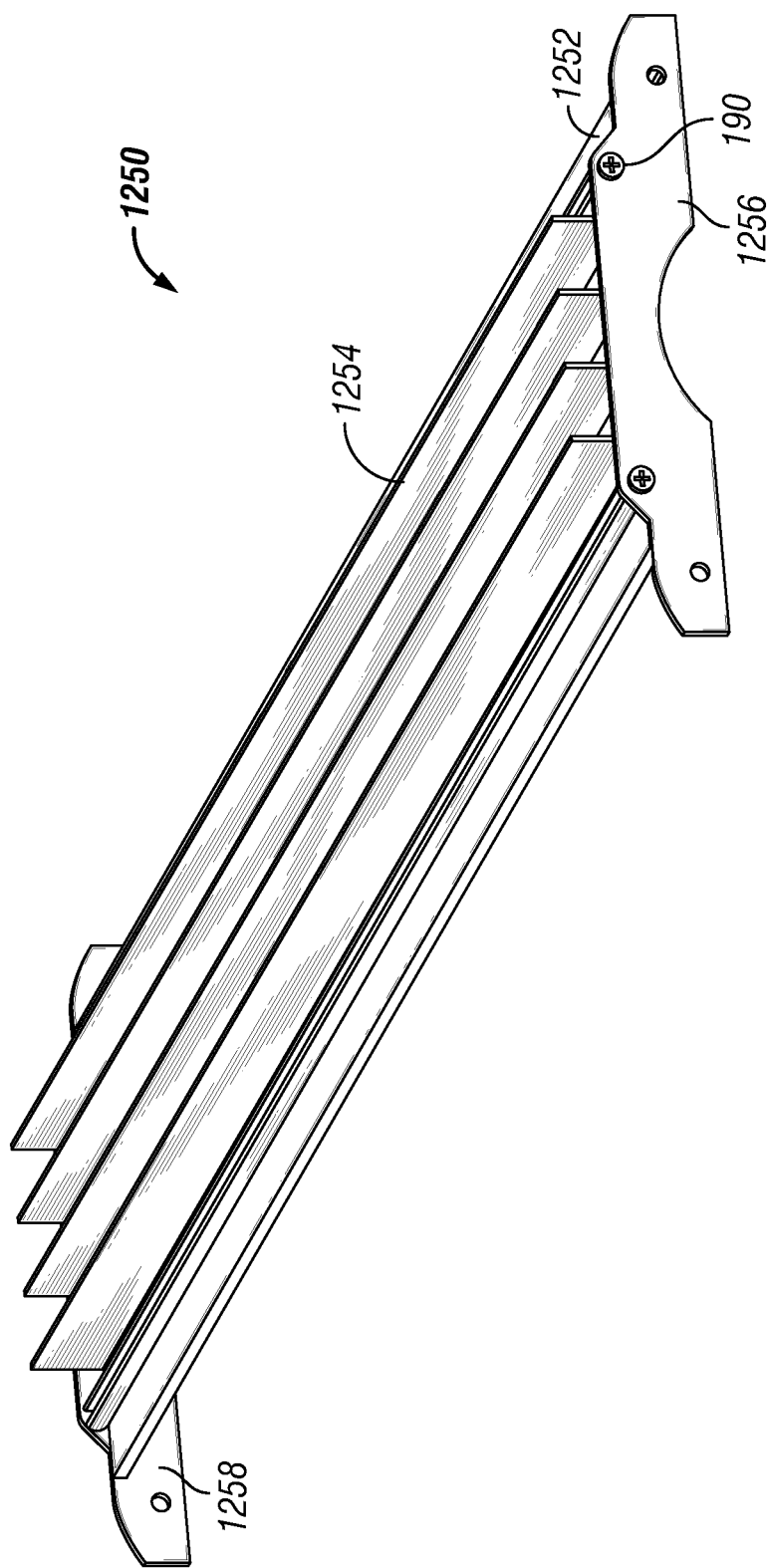

Referring to FIG. 25J, the door 1250 is assembled. In certain exemplary embodiments, a brazing material is placed along at least portions of the edges of the base 1252 and lower portions of certain fins 1254 that are to be in contact with each of the door caps 1256, 1258. Alternatively, or additionally, the brazing material is placed along at least portions of the door caps 1256, 1258 that are to be in contact with portions of the base 1252 and the lower portions of the fins 1254. The door cap 1256 is fastened to the base 1252 using two coupling devices 190. Similarly, door cap 1258 also is fastened to the base 1252 using two coupling devices 190. In other exemplary embodiments, the brazing material is placed adjacent to these points of contact between the door caps 1256, 1258 and the base 1252 and the lower portions of the fins 1254 after the door caps 1256, 1258 are fastened to base 1252, but before these fastened components are placed within the furnace 2590 (FIG. 25F). According to certain exemplary embodiments, a substantially consistent gap is provided between the different components to be brazed together, which allows the brazing material to flow sufficiently. As previously described with respect to FIGS. 25F-H, these fastened components are placed in the furnace 2590, then the molten salt bath 2595, and then is optionally finished and/or painted. Once the assembly of the door 1250 is completed and referring now to FIG. 23, the door 1250 is fastened to the top portion of the heat sink chassis 1210 using two coupling devices 190 that proceed through the door cap 1256, the front panel 2330, and into the screw track 1223 and using two coupling devices 190 that proceed through the door cap 1258, the rear panel 2340, and into the screw track 1223. When two coupling devices 190 in the same screw track 1223, which are used to fasten the door 1250 to the heat sink chassis 1210, are removed, the door 1223 pivotally opens and closes thereby providing access to the drivers 370 and the wires within the manifold chamber 1425.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

I claim:

1. A method of assembling a light fixture, the method comprising:
   coupling a member of a light fixture housing to a manifold chamber of the light fixture housing,
      wherein the member defines a wire way within the member,
      wherein the manifold chamber comprises boundary walls that define a manifold therein for housing a light emitting diode (LED) driver and having one or more openings along the boundary walls,
      wherein the wire way defined by the member provides a pathway for routing electrical wires from the LED driver to an LED module in a concealed manner, and
      wherein the step of coupling comprises:
         positioning an end portion of the member of the light fixture housing and an opening of the one or more openings of the manifold chamber of the light fixture housing such that the end portion of the member and the opening are substantially aligned;
         applying a brazing material between the end portion of the member and the manifold chamber at least at the opening of the manifold chamber that is substantially aligned with the end portion of the member; and
         fastening the end portion of the member and the manifold chamber to maintain the positioning and alignment of the portion of the member and the manifold chamber, wherein one or more gaps are formed between the portion of the member and the manifold chamber;
   pre-heating the brazing material and the substantially aligned member and manifold chamber of the light fixture housing to a first temperature;
   placing the brazing material and the substantially aligned member and manifold chamber of the light fixture housing into a molten salt bath, wherein the brazing material flows into the one or more gaps between the portion of the member and the manifold chamber of the light fixture housing; and
   cooling the substantially aligned member and manifold chamber of the light fixture housing to form a metallurgical bond therebetween.

2. The method of claim 1, further comprising:
   positioning another member of the light fixture housing adjacent the manifold chamber;
   applying a brazing material between at least a portion of the other member and the manifold chamber of the light fixture housing; and
   fastening the portion of the other member to the manifold chamber of the light fixture housing, wherein one or more gaps are formed between the portion of the other member and the manifold chamber of the light fixture housing.

3. The method of claim 1, wherein the brazing material is selected from at least one of an aluminum clad material or a flux material.

4. The method of claim 1, wherein the brazing material is in a shim form or a paste form.

5. The method of claim 1, wherein the brazing material comprises about ninety percent aluminum.

6. The method of claim 1, wherein the one or more gaps are substantially uniform.

7. The method of claim 1, wherein the temperature of the molten salt bath is above the melting temperature of the brazing material and lower than the melting temperature of the member and the manifold chamber of the light fixture housing.

8. The method of claim 1, wherein the pre-heating is performed in a furnace open to the atmosphere.

9. The method of claim 1, wherein the pre-heating is performed in an enclosed furnace.

10. The method of 9, wherein the enclosed furnace is pressurized.

11. The method of claim 1, further comprising finishing the brazed member and manifold chamber.

12. The method of claim 1, wherein the first temperature is at least 900 Fahrenheit.

13. A method of assembling a light fixture, the method comprising:
   coupling a front panel of a light fixture housing to a manifold chamber of the light fixture housing,
      wherein the manifold chamber defines a manifold and a concealed wire way therein, the concealed wire way extending to one or more openings arranged in an array, and wherein the step of coupling comprises:
positioning the front panel of the light fixture housing adjacent to a first edge of the manifold chamber;
applying a brazing material between the front panel and the manifold chamber at least at the edge of the manifold chamber;
fastening the front panel to the manifold chamber with at least one coupling device, wherein one or more gaps are formed between the front panel and the manifold chamber;
coupling a rear panel of the light fixture housing to the manifold chamber of the light fixture housing,
wherein the step of coupling the rear panel to the manifold chamber comprises:
positioning the rear panel of the light fixture housing adjacent to a second edge of the manifold chamber of the light fixture housing, the second edge being on an opposite side of the manifold chamber from the first edge;
applying the brazing material between the rear panel and the manifold chamber at least at the second edge of the manifold chamber;
fastening the rear panel to the manifold chamber with at least one coupling device, wherein one or more gaps are formed between the rear panel and the manifold chamber;
pre-heating the fastened front panel, rear panel, and manifold chamber of the light fixture housing and the brazing material to a first temperature;
placing the fastened front panel, rear panel, and manifold chamber of the light fixture housing and the brazing material into a molten salt bath, wherein the brazing material flows into the gaps between the front panel and the manifold chamber of the light fixture housing and the rear panel and the manifold chamber of the light fixture housing; and
cooling the fastened front panel, rear panel, and manifold chamber of the light fixture housing to form a metallurgical bond therebetween.

14. The method of claim 13, wherein the first temperature is at least 900 Fahrenheit.

15. The method of claim 13, wherein the pre-heating is performed in an enclosed furnace.

16. The method of claim 13, wherein the enclosed furnace is pressurized.

17. The method of claim 1, wherein the member is an elbow that comprises a first end and a second end, and wherein the portion of the member is one of the first end and the second end.

* * * * *